(12) United States Patent
Aoshima

(10) Patent No.: US 11,377,513 B2
(45) Date of Patent: Jul. 5, 2022

(54) CONJUGATED DIENE POLYMER AND METHOD FOR PRODUCING CONJUGATED DIENE POLYMER

(71) Applicant: SUMITOMO CHEMICAL COMPANY, LIMITED, Tokyo (JP)

(72) Inventor: Hiroshi Aoshima, Ichihara (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 108 days.

(21) Appl. No.: 16/498,684

(22) PCT Filed: Mar. 26, 2018

(86) PCT No.: PCT/JP2018/012133
§ 371 (c)(1),
(2) Date: Sep. 27, 2019

(87) PCT Pub. No.: WO2018/181176
PCT Pub. Date: Oct. 4, 2018

(65) Prior Publication Data
US 2020/0031976 A1 Jan. 30, 2020

(30) Foreign Application Priority Data
Mar. 31, 2017 (JP) .................... JP2017-071937

(51) Int. Cl.
| C08F 236/10 | (2006.01) |
| C08F 2/06 | (2006.01) |
| C08F 279/02 | (2006.01) |
| C08F 8/42 | (2006.01) |
| C08K 5/56 | (2006.01) |

(52) U.S. Cl.
CPC ............. *C08F 236/10* (2013.01); *C08F 2/06* (2013.01); *C08F 8/42* (2013.01); *C08F 279/02* (2013.01); *C08K 5/56* (2013.01)

(58) Field of Classification Search
CPC .. C08F 236/10; C08F 2/06; C08F 5/56; C08F 8/42; C08F 279/02; C08K 5/56
See application file for complete search history.

(56) References Cited

U.S. PATENT DOCUMENTS

| 4,547,560 A | 10/1985 | Hattori et al. |
| 2005/0154156 A1 | 7/2005 | Karato et al. |
| 2010/0016499 A1 | 1/2010 | Oshima |
| 2010/0056712 A1 | 3/2010 | Oshima |
| 2010/0056713 A1 | 3/2010 | Oshima |
| 2010/0113683 A1 | 5/2010 | Matsumoto et al. |
| 2010/0152369 A1 | 6/2010 | Shibata et al. |
| 2014/0088256 A1* | 3/2014 | Fujii ............... C08F 236/10 525/105 |
| 2015/0361210 A1 | 12/2015 | Nosaka et al. |
| 2015/0368387 A1 | 12/2015 | Nosaka et al. |
| 2018/0030251 A1 | 2/2018 | Suzuki et al. |

FOREIGN PATENT DOCUMENTS

| CN | 101659732 A | 3/2010 |
| CN | 104995214 A | 10/2015 |
| EP | 2 484 701 A1 | 8/2012 |
| EP | 2 957 572 A1 | 12/2015 |
| JP | 1-217011 A | 8/1989 |
| JP | H07-292160 A | 11/1995 |
| JP | 2001-139633 A | 5/2001 |
| JP | 2008-239966 A | 10/2008 |
| JP | 2008-260943 A | 10/2008 |
| JP | 2010-077412 A | 4/2010 |
| JP | 2012-172077 A | 9/2012 |
| JP | 2013-209462 A | 10/2013 |
| JP | 2013-216024 A | 10/2013 |
| JP | 2014-055264 A | 3/2014 |
| JP | 2014-80599 A | 5/2014 |
| JP | 2014-201637 A | 10/2014 |
| JP | 2016-216545 A | 12/2016 |
| WO | 03/078482 A1 | 9/2003 |
| WO | 2008/123163 A1 | 10/2008 |
| WO | 2008/123164 A1 | 10/2008 |
| WO | 2014/133097 A1 | 9/2014 |
| WO | 2016/139960 A1 | 9/2016 |

OTHER PUBLICATIONS

International Search Report dated May 1, 2018 for International Patent Application No. PCT/JP2018/012133.
Notice of Reasons for Rejection dated Mar. 30, 2021, from the Japanese Patent Office in Application English No. 2017-071937.
International Preliminary Report on Patentability and Translation of the Written Opinion from the International Bureau in application No. PCT/JP2018/012133, dated Oct. 10, 2019.
"Database WPI, Week 201705", Thomson Scientific, London, GB; AN 2016-81477P, Dec. 22, 2016, XP002801785 (2 pages total).
"Database WPI, Week 201372", Thomson Scientific, London, GB; AN 2013-S54907, Oct. 24, 2013, XP002801786 (3 pages total).
Extended European Search Report dated Feb. 2, 2021 from European Patent Office in EP Application No. 18776123.4.
Partial Supplemental European Search Report dated Oct. 15, 2020 from European Patent Office in EP Application No. 18776123.4.
First Office Action dated Aug. 4, 2021 by the National Intellectual Property Administration, P.R. China in application No. 201880020338.X.
Notice of Reasons for Rejection dated Dec. 21, 2021 from the Japanese Patent Office in Japanese Application No. 2017-071937.
Second Office Action dated Mar. 25, 2022 in Chinese Application No. 201880020338.X.

\* cited by examiner

*Primary Examiner* — Robert D Harlan
(74) *Attorney, Agent, or Firm* — Sughrue Mion, PLLC

(57) ABSTRACT

The method for producing a conjugated diene-based polymer of the invention comprises step 1 in which a polymerization initiator is added to a monomer including a conjugated diene compound in a hydrocarbon solvent to obtain a polymerization solution, and step 2 in which a polymerization initiator is further added to the polymerization solution either once or two or more times to obtain a polymer with an active end, wherein in step 1 and/or step 2, a modifying agent is added which has a functional group that is copolymerizable with the conjugated diene compound.

7 Claims, 2 Drawing Sheets

CONJUGATED DIENE POLYMER AND METHOD FOR PRODUCING CONJUGATED DIENE POLYMER

CROSS REFERENCE TO RELATED APPLICATIONS

This application is a National Stage of International Application No. PCT/JP2018/012133 filed Mar. 26, 2018, claiming priority based on Japanese Patent Application No. 2017-071937 filed Mar. 31, 2017.

TECHNICAL FIELD

The present invention relates to a conjugated diene-based polymer and to a method for producing the conjugated diene-based polymer.

BACKGROUND ART

As increasing attention is being given to environmental issues in recent years, there is increasing demand for greater fuel efficiency from the polymer compositions used in automobile tires. Examples of polymer compositions that are used for vehicle tires include polymer compositions containing conjugated diene-based polymers, such as polybutadiene and butadiene-styrene copolymer, and fillers such as carbon black and silica.

For polymerization of conjugated diene-containing monomers, for example, efforts are being made to improve fuel efficiency by modification of the polymers with modifying agents during their preparation (see Patent Literature 1, for example).

CITATION LIST

Patent Literature

Patent Literature 1: JP 2008-239966 A

SUMMARY OF INVENTION

Technical Problem

However, polymer compositions using such conventional conjugated diene-based polymers have tended to exhibit poor processability and durability, especially when silica is used as the filler, despite their superior fuel efficiency performance.

It is an object of the present invention to provide a conjugated diene-based polymer with excellent processability and durability, as well as a method for producing the conjugated diene-based polymer.

Solution to Problem

The invention relates to a method for producing a conjugated diene-based polymer comprising step 1 in which a polymerization initiator is added to a monomer including a conjugated diene compound in a hydrocarbon solvent to obtain a polymerization solution, and step 2 in which a polymerization initiator is further added to the polymerization solution either once or two or more times to obtain a polymer with an active end, wherein in step 1 and/or step 2, a modifying agent is added which has a functional group that is copolymerizable with the conjugated diene compound.

The invention further relates to a method for producing a conjugated diene-based polymer comprising step 1 in which a polymerization initiator is added to a monomer including a conjugated diene compound in a hydrocarbon solvent to obtain a polymerization solution, step 2 in which a polymerization initiator is further added to the polymerization solution either once or two or more times to obtain a polymer with an active end, and step 3 in which the polymer with the active end is reacted with a modifying agent having a functional group that is reactive with the active end, to introduce the modifying agent-based unit at the end of the polymer.

The invention further relates to a conjugated diene-based polymer having at least a peak with a peak top molecular weight greater than 800,000, a peak with a peak top molecular weight in the range of 800,000 to 100,000 and a peak with a peak top molecular weight less than 100,000, as measured by gel permeation chromatography, and having a monomer unit derived from at least one type of modifying agent selected from the group consisting of compounds with the structure represented by the following formula (6), compounds with the structure represented by the following formula (7) and compounds with the structure represented by the following formula (8).

[Chemical Formula 1]

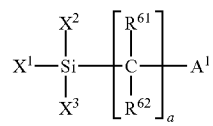

(6)

[In formula (6), $X^1$, $X^2$ and $X^3$ each independently represent a hydrocarbyl group, a hydrocarbyloxy group, a halogen atom or a functional group capable of reacting with the active end of the conjugated diene-based polymer, $R^{61}$ and $R^{62}$ each independently represent a hydrogen atom or a hydrocarbyl group, and when multiple $R^{61}$ and $R^{62}$ groups are present they may be the same or different, $A^1$ represents an organic group having at least one atom selected from the group consisting of oxygen atoms, nitrogen atoms, phosphorus atoms, sulfur atoms and silicon atoms, optionally having a ring structure, with a portion of the structure of $X^1$, $X^2$ or $X^3$ optionally bonded to a portion of $A^1$, and "a" represents an integer of 0 to 10.]

[Chemical Formula 2]

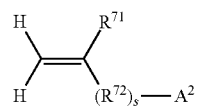

(7)

[In formula (7), $R^{71}$ represents a hydrogen atom or a hydrocarbyl group, s represents 0 or 1 (an integer of 0 or 1), $R^{72}$ represents a hydrocarbylene group, and $A^2$ represents a substituted amino group, a nitrogen-containing heterocyclic group or a substituted silyl group.]

[Chemical Formula 3]

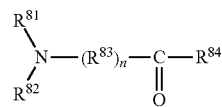

(8)

[In formula (8), $R^{81}$ and $R^{82}$ each independently represent an optionally substituted hydrocarbyl group, or they represent a hydrocarbylene group wherein a portion of $R^{81}$ and a portion of $R^{82}$ are bonded, optionally having a nitrogen atom and/or an oxygen atom, or $R^{84}$ represents an optionally substituted hydrocarbyl group or a hydrogen atom, or a portion of either $R^{81}$ or $R^{82}$ and a portion of $R^{84}$ are bonded together to form a hydrocarbylene group, which optionally has a nitrogen atom and/or an oxygen atom. $R^{83}$ represents a divalent group, and n is 0 or 1.]

Advantageous Effects of Invention

According to the invention it is possible to provide a conjugated diene-based polymer with excellent processability and durability, as well as a method for producing the conjugated diene-based polymer.

DESCRIPTION OF EMBODIMENTS

Figure 1:
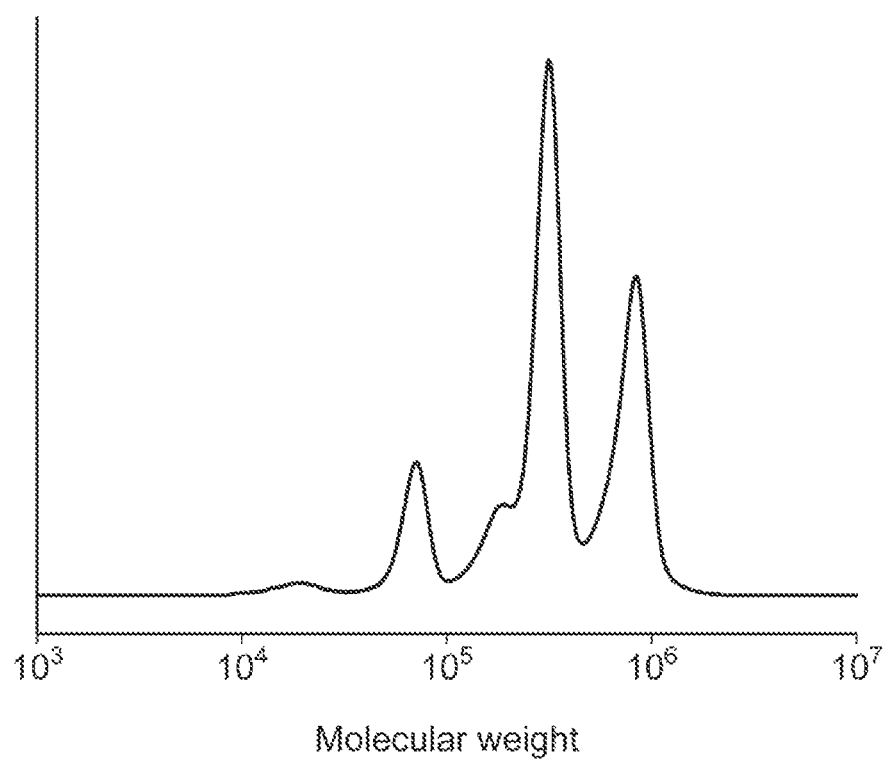
FIG. 1 is a GPC chart for the conjugated diene-based polymer obtained in Example 1.

Embodiments of the invention will now be described in detail. However, the invention is not limited to the embodiments described below.

Throughout the present specification, "hydrocarbyl group" refers to a monovalent group resulting from removal of one hydrogen from a hydrocarbon. The term "hydrocarbylene group" refers to a divalent group resulting from removal of two hydrogen atoms from a hydrocarbon. The term "hydrocarbyloxy group" refers to a monovalent group having a structure in which the hydrogen of a hydroxyl group is replaced by a hydrocarbyl group. The phrase "amino group with a substituent" (hereunder also referred to as "substituted amino group") refers to a group having a structure in which at least one hydrogen of an amino group is replaced by a monovalent atom other than hydrogen, or a monovalent group, or a group having a structure in which the two hydrogen atoms of an amino group are replaced by a divalent group. The phrase "hydrocarbyl group with a substituent" (hereunder also referred to as "substituted hydrocarbyl group") means a monovalent group having a structure in which at least one hydrogen of a hydrocarbyl group is replaced by a substituent. The phrase "hydrocarbylene group with a nitrogen atom and/or an oxygen atom" refers to a divalent group having a structure in which a carbon atom of the hydrocarbylene group other than a carbon atom from which a hydrogen has been removed, and/or hydrogen, is replaced by a group with a nitrogen atom and/or an oxygen atom.

[Conjugated Diene-Based Polymer]

The conjugated diene-based polymer of this embodiment may have a unit based on the modifying agent at the end of the polymer, or it may have a unit based on the modifying agent within the molecular chain of the polymer, or it may have a unit based on the modifying agent both at the end and within the molecular chain of the polymer. When a modifying agent has numerous functional groups it tends to result in superior fuel efficiency. The conjugated diene-based polymer of the present embodiment may be produced by the following method.

The method for producing a conjugated diene-based polymer of this embodiment comprises step 1 in which a polymerization initiator is added to a monomer including a conjugated diene compound in a hydrocarbon solvent to obtain a polymerization solution, and step 2 in which a polymerization initiator is further added to the polymerization solution either once or two or more times to obtain a polymer with an active end, wherein in step 1 and/or step 2, a modifying agent is added which has a functional group that is copolymerizable with the conjugated diene compound. A unit based on the modifying agent is thus introduced into the molecular chain of the polymer.

Specifically, in step 1, a polymerization solution may be obtained by adding a polymerization initiator to a monomer containing a conjugated diene compound and a modifying agent having a functional group that is copolymerizable with the conjugated diene compound, in a hydrocarbon solvent. In step 2, a modifying agent having a functional group that is copolymerizable with the conjugated diene compound is added to the polymerization solution obtained in step 1, and the polymerization initiator is further added either once or two or more times to obtain a polymer with an active end.

This method may further comprise, after step 2, another step 3 in which the polymer with the active end is reacted with a modifying agent having a functional group that is reactive with the active end, to introduce a unit based on the modifying agent at the polymer end. Thus, the unit based on the modifying agent is introduced at the end as well, in addition to within the molecular chains of the polymer.

The method for producing a conjugated diene-based polymer of this embodiment may also comprise step 1 in which a polymerization initiator is added to a monomer including a conjugated diene compound in a hydrocarbon solvent to obtain a polymerization solution, step 2 in which a polymerization initiator is further added to the polymerization solution either once or two or more times to obtain a polymer with an active end, and step 3 in which the polymer with the active end is reacted with a modifying agent having a functional group that is reactive with the active end, to introduce the modifying agent-based unit at the end of the polymer. A unit based on the modifying agent is thus introduced at the end of the polymer.

The polymerization in steps 1 to 3 may be carried out as a batch process. The reactor used may be a stirrer-equipped batch reactor or tube reactor.

The conjugated diene-based polymer of this embodiment has at least a peak with a peak top molecular weight (Mp) of greater than 800,000, a peak with a peak top molecular weight in the range of 100,000 to 800,000 and a peak with a peak top molecular weight less than 100,000, as measured by gel permeation chromatography (GPC). The peak top molecular weight (Mp) is the value measured by GPC and calculated using standard polystyrene.

The Mp of peak A, as the peak of maximum height in a peak top molecular weight (Mp) range of greater than 800,000, is preferably in the range of greater than 800,000 but no greater than 3,000,000, and more preferably in the range of 800,000 to 2,000,000, since this will further improve the durability. The Mp of peak B, as the peak of maximum height in a peak top molecular weight range of 100,000 to 800,000, is preferably in the range of 150,000 to 750,000 and more preferably the range of 200,000 to 700,000, since this will further improve the fuel efficiency performance. The Mp of peak C, as the peak of maximum height in a peak top molecular weight range of less than 100,000 is preferably in the range of 10,000 or greater but less than 100,000, and more preferably 30,000 or greater but less than 100,000, since this will further improve the processability.

The area of peak B is preferably 40 to 95%, more preferably 40 to 90% and even more preferably 45 to 85%, based on the total peak area, since this will further improve the fuel efficiency performance. The area of peak C is preferably no greater than 20% and more preferably 5 to 20%, based on the total peak area, since this will further improve the processability.

The area of each peak can be calculated as the ratio with respect to the total peak area that is formed in the molecular weight distribution curve obtained by GPC measurement. The total peak area is the total area of the region defined by a line (baseline) connecting the start point (rising edge) of the peak of maximum molecular weight and the end point (trailing edge) of the peak of the minimum molecular weight. The area of peak A may be calculated from the portion delineated between a perpendicular line drawn down to the baseline from the start point of peak A, or from the lowest valley between peak A and the peak on the high-molecular-weight side adjacent to peak A, and a perpendicular line drawn down to the baseline from the lowest valley between peak A and the peak on the low-molecular-weight side adjacent to peak A. The area of peak B may be calculated from the portion delineated between a perpendicular line drawn down to the baseline from the lowest valley between peak B and the peak on the high-molecular-weight side adjacent to peak B, and a perpendicular line drawn down to the baseline from the lowest valley between peak B and the peak on the low-molecular-weight side adjacent to peak B. The area of peak C may be calculated from the portion delineated between a perpendicular line drawn down to the baseline from the lowest valley between peak C and the peak on the high-molecular-weight side adjacent to peak C, and a perpendicular line drawn down to the baseline from the end point of peak C or the lowest valley between peak C and the peak on the low-molecular-weight side adjacent to peak C.

The molecular weight distribution of the conjugated diene-based polymer of this embodiment is preferably 1.5 to 5.0, more preferably 1.8 to 3.5 and even more preferably 2.0 to 3.0. The molecular weight distribution is preferably narrower from the viewpoint of fuel efficiency and durability, whereas the molecular weight distribution is preferably wider from the viewpoint of processability. The molecular weight distribution can be determined by measuring the number-average molecular weight (Mn) and weight-average molecular weight (Mw) by GPC, and dividing Mw by Mn. Mp, Mw and Mn can be measured with an "HLC-8020" GPC apparatus by Tosoh Corp., for example. The column used may be a "GMH-XL" by Tosoh Corp., for example. Standard polystyrene by Tosoh Corp., for example, may be used as the molecular weight standard.

The Mooney viscosity ($ML_{1+4}$) of the modified conjugated diene-based polymer is preferably 10 or greater, more preferably 20 or greater and even more preferably 30 or greater, for increased tensile break strength. The Mooney viscosity of the modified conjugated diene-based polymer is also preferably no greater than 200, more preferably no greater than 150 and even more preferably no greater than 100, for increased processability. The Mooney viscosity ($ML_{1+4}$) is measured at 100° C., according to JIS K6300 (1994).

The amount of vinyl bonds in the conjugated diene-based polymer is preferably no greater than 80 mol %, more preferably no greater than 70 mol % and even more preferably no greater than 60 mol %, with the monomer unit content from the conjugated diene compound as 100 mol %, for increased fuel efficiency performance. The amount of vinyl bonds in the modified conjugated diene-based polymer is also preferably 10 mol % or greater, more preferably 15 mol % or greater, even more preferably 20 mol % or greater and most preferably 30 mol % or greater, with the monomer unit content from the conjugated diene compound as 100 mol %, for an increased wet grip property. The amount of vinyl bonds may be determined by infrared spectroscopic analysis, based on the absorption intensity near 910 $cm^{-1}$ which is the absorption peak for vinyl groups.

The conjugated diene-based polymer may be produced by polymerization of the monomer including the conjugated diene compound with divided addition of a polymerization initiator over two or more times (preferably 3 or more times).

The components that may be used to produce the conjugated diene-based polymer of this embodiment will now be described.

Examples of conjugated diene compounds include 1,3-butadiene, isoprene, 1,3-pentadiene, 2,3-dimethyl-1,3-butadiene and 1,3-hexadiene, with 1,3-butadiene or isoprene being preferred.

The monomers for this embodiment may include aromatic vinyl compounds with the conjugated diene compound. Examples of aromatic vinyl compounds include styrene, α-methylstyrene, vinyltoluene, vinylnaphthalene, divinylbenzene, trivinylbenzene and divinylnaphthalene, with styrene being preferred.

The aromatic vinyl compound content of the monomers is preferably 5 mass % or greater, more preferably 14 mass % or greater and even more preferably 20 mass % or greater, with 100 mass % as the total mass of the monomers. The aromatic vinyl compound content is also preferably no greater than 50 mass %, more preferably no greater than 45 mass % and even more preferably no greater than 40 mass %, for increased fuel efficiency.

Examples of the polymerization initiator include an alkali metal, a complex of an alkali metal and a polar compound, an oligomer with an alkali metal, an organic alkali metal compound, a Ziegler-Natta catalyst, and a metallocene catalyst. Organic alkali metal compounds are preferred as polymerization initiators. Such polymerization initiators may be used alone or in combinations of two or more.

Examples of organic alkali metal compounds include organic alkali metal compounds with hydrocarbyl groups, such as ethyllithium, n-propyllithium, isopropyllithium, n-butyllithium, sec-butyllithium, tert-butyllithium, tert-octyllithium, n-decyllithium, phenyllithium, 2-naphthyllithium, 2-butylphenyllithium, 4-phenylbutyllithium, cyclohexyllithium, cyclopentyllithium, 1,4-dilithio-2-butene, 1,3,3-trilithiooctyne, lithiated mesitylene, sodium naphthalenide, sodium biphenylide and potassium naphthalenide; and organic alkali metal compounds with nitrogen atom-containing groups such as compounds obtained by reacting isoprene with methylaminopropyllithium, diethylaminopropyllithium, tert-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 3-(dimethylamino)propyllithium or 3-(diethylamino)propyllithium. A preferred organic alkali metal compound is n-butyllithium.

The total amount of polymerization initiator used is preferably 0.01 to 15 mmol and more preferably 0.02 to 10 mmol per 100 g of the total monomer. After a portion of the polymerization initiator has been added in step 1 of this embodiment, the remaining polymerization initiator may be added in step 2, either at once or divided into two or more times, to obtain a conjugated diene-based polymer having excellent processability and durability. Addition of the polymerization initiator in step 2 may also be carried out 2 to 5 times.

Polymerization of the monomer is preferably carried out in a hydrocarbon solvent. Aliphatic hydrocarbons, aromatic hydrocarbons and alicyclic hydrocarbons may be used as hydrocarbon solvents. Such hydrocarbon solvents may be used alone or in combinations of two or more, and a mixture of an aliphatic hydrocarbon such as industrial hexane and an alicyclic hydrocarbon may also be used.

Examples of aliphatic hydrocarbons include propane, n-butane, isobutane, n-pentane, isopentane, 2-methylpentane, 3-methylpentane, n-hexane, propene, 1-butene, isobutene, trans-2-butene, cis-2-butane, 1-pentene, 2-pentene, 1-hexene and 2-hexene. Examples of aromatic hydrocarbons include benzene, toluene, xylene and ethylbenzene. Examples of alicyclic hydrocarbons include cyclopentane, cyclohexane and methylcyclopentane.

When polymerization of the monomers is to be carried out in a solvent, the concentration of the monomers in the solvent will usually be 1 to 50 mass %, and is preferably 5 to 30 mass %. The polymerization temperature will usually be 25 to 100° C., preferably 35 to 90° C. and more preferably 50 to 80° C. The polymerization time will usually be 10 minutes to 5 hours.

The conjugated diene-based polymer of this embodiment has a monomer unit derived from at least one type of modifying agent selected from the group consisting of compounds with the structure represented by the following formula (6), compounds with the structure represented by the following formula (7) and compounds with the structure represented by the following formula (8).

The modifying agent added in step 1 and/or step 2 may be a compound having a structure represented by formula (7). The compound has a functional group that is copolymerizable with the conjugated diene compound. By polymerizing the conjugated diene compound with the compound having a structure represented by formula (7), it is possible to obtain a conjugated diene-based polymer having a unit based on the compound with the structure represented by formula (7), within its molecular chain.

[Chemical Formula 4]

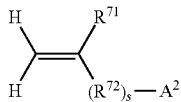
(7)

In formula (7), $R^{71}$ represents a hydrogen atom or a hydrocarbyl group, s represents 0 or 1 (an integer of 0 or 1), $R^{72}$ represents a hydrocarbylene group, and $A^2$ represents a substituted amino group, a nitrogen-containing heterocyclic group or a substituted silyl group.

Examples of hydrocarbyl groups for $R^{71}$ include alkyl, alkenyl and aryl groups.

Preferred alkyl groups are alkyl groups of 1 to 12 carbon atoms, examples of which include methyl, ethyl, n-propyl, isopropyl, n-butyl, sec-butyl and tert-butyl groups, with methyl being preferred. Preferred alkenyl groups are alkenyl groups of 2 to 12 carbon atoms, examples of which include vinyl, allyl, 1-propenyl and isopropenyl groups, with vinyl being preferred. Preferred aryl groups are aryl groups of 6 to 12 carbon atoms, examples of which include phenyl, methylphenyl and ethylphenyl groups, with phenyl being preferred.

$R^{71}$ is preferably a hydrogen atom or a methyl, vinyl or phenyl group, and it is more preferably a hydrogen atom.

Examples of hydrocarbylene groups for $R^{72}$ include alkylene and arylene groups, and groups in which arylene and alkylene groups are bonded.

Preferred alkylene groups are alkylene groups of 2 to 6 carbon atoms, examples of which include methylene, ethylene and trimethylene groups, and more preferably methylene and ethylene groups. Preferred arylene groups include arylene groups of 5 to 12 carbon atoms, examples of which include phenylene, naphthylene and biphenylene groups, and more preferably phenylene. Examples of groups in which an arylene group and an alkylene group are bonded include groups in which a phenylene group and an alkylene group are bonded, groups in which a naphthylene group and an alkylene group are bonded, and groups in which a biphenylene group and an alkylene group are bonded, and preferably groups in which a phenylene group and an alkylene group are bonded.

In a group in which an arylene group and an alkylene group are bonded, preferably the carbon atom of the arylene group is bonded to the carbon atom to which $R^{71}$ of formula (7) is bonded.

Examples of groups in which a phenylene group and an alkylene group are bonded (phenylene-alkylene groups) include groups represented by formula (7-R).

[Chemical Formula 5]

(7-R)

In the formula, "d" represents an integer of 1 to 10.

Phenylene-alkylene groups may be para-phenylene-alkylene, meta-phenylene-alkylene or ortho-phenylene-alkylene groups, depending on the position of the carbon atom on the benzene ring to which the alkylene group is bonded. In the case of a group represented by formula (7-R), the para-phenylene-alkylene group is a group represented by formula (7-Ra), the meta-phenylene-alkylene group is a group represented by formula (7-Rb), and the ortho-phenylene-alkylene group is a group represented by formula (7-Rc).

[Chemical Formula 6]

(7-Ra)

[Chemical Formula 7]

(7-Rb)

-continued

[Chemical Formula 8]

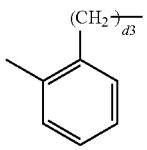
(7-Rc)

In the formulas, d1, d2 and d3 each independently represent an integer of 1 to 10.

A group in which an arylene group and an alkylene group are bonded is preferably a group in which a phenylene group and an alkylene group are bonded (phenylene-alkylene group), more preferably it is a group represented by formula (7-Ra) or a group represented by formula (7-Rb), and more preferably it is a para-phenylene-methylene group (a group represented by formula (7-Ra) wherein d1=1), a meta-phenylene-methylene group (a group represented by formula (7-Rb) wherein d2=1), a para-phenylene-ethylene group (a group represented by formula (7-Ra) wherein d1=2) or a meta-phenylene-ethylene group (a group represented by formula (7-Rb) wherein d2=2).

Examples of substituted amino groups for $A^2$ include groups represented by formula (7-X) and groups represented by formula (7-Y).

[Chemical Formula 9]

(7-X)

In formula (7-X), $R^{73}$ and $R^{74}$ each independently represent a hydrocarbyl group or a trihydrocarbylsilyl group, or a hydrocarbylene group formed by bonding between a portion of $R^{73}$ and a portion of $R^{74}$, and optionally having a nitrogen atom and/or an oxygen atom.

[Chemical Formula 10]

—N=$R^{75}$
(7-Y)

In formula (7-Y), $R^{75}$ represents a hydrocarbylidene group. Incidentally, $R^{75}$ is a group corresponding to formula (7-X) wherein $R^{73}$ and $R^{74}$ are each a single group and are bonded to a nitrogen atom by a double bond.

Examples of hydrocarbyl groups for $R^{73}$ and $R^{74}$ include alkyl, alkenyl, alkynyl, aryl and aralkyl groups. Preferred alkyl groups are alkyl groups of 1 to 12 carbon atoms, examples of which include methyl, ethyl, n-propyl, isopropyl, n-butyl, sec-butyl and tert-butyl groups. Preferred alkenyl groups are alkenyl groups of 2 to 12 carbon atoms, with examples including vinyl, allyl, I-propenyl and isopropenyl groups. Preferred alkynyl groups are alkynyl groups of 2 to 12 carbon atoms, examples of which include ethynyl and 2-propynyl groups. Preferred aryl groups are aryl groups of 6 to 12 carbon atoms, examples of which include phenyl, tolyl and xylyl groups. Preferred aralkyl groups are aralkyl groups of 7 to 13 carbon atoms, with an example being benzyl group.

The number of carbon atoms of a hydrocarbyl group is preferably 1 to 10, more preferably 1 to 4 and even more preferably 1 to 2. The hydrocarbyl groups are preferably alkyl groups, and more preferably straight-chain alkyl groups.

Examples of trihydrocarbylsilyl groups for $R^{73}$ and $R^{74}$ include trialkylsilyl groups of 3 to 12 carbon atoms such as trimethylsilyl, triethylsilyl, triisopropylsilyl and tert-butyldimethylsilyl groups.

A trihydrocarbylsilyl group is preferably a trialkylsilyl group of 3 to 9 carbon atoms, more preferably a trialkylsilyl group wherein the alkyl group bonded to the silicon atom is an alkyl group of 1 to 3 carbon atoms, and even more preferably a trimethylsilyl group.

Examples of hydrocarbylene groups wherein a portion of $R^{73}$ and a portion of $R^{74}$ are bonded, and optionally having a nitrogen atom and/or an oxygen atom, include hydrocarbylene, nitrogen atom-containing hydrocarbylene and oxygen atom-containing hydrocarbylene groups.

Examples of hydrocarbylene groups include alkylene groups such as ethylene, trimethylene, tetramethylene, pentamethylene and hexamethylene groups.

Examples of nitrogen atom-containing hydrocarbylene groups include the group represented by —$CH_2CH_2$—NH—$CH_2$—, the group represented by —$CH_2CH_2$—N=CH—, the group represented by —CH=CH—N=CH— and the group represented by —$CH_2CH_2$—NH—$CH_2CH_2$—.

Examples of oxygen atom-containing hydrocarbylene groups include the group represented by —$CH_2CH_2$—O—$CH_2CH_2$—.

The number of carbon atoms of a hydrocarbylene group optionally having a nitrogen atom and/or an oxygen atom is preferably 2 to 20, more preferably 2 to 7 and even more preferably 4 to 6.

A hydrocarbylene group optionally having a nitrogen atom and/or an oxygen atom is preferably a hydrocarbylene group, more preferably an alkylene group and even more preferably a polymethylene group.

Preferably, $R^{73}$ and $R^{74}$ are each independently an alkyl or trialkylsilyl group or an alkylene group in which a portion of $R^{73}$ and a portion of $R^{74}$ are bonded, and more preferably they are each independently an alkyl group.

Groups represented by formula (7-X) include acyclic amino groups and cycloamino groups.

Among acyclic amino groups, examples of groups of formula (7-X) wherein $R^{73}$ and $R^{74}$ are hydrocarbyl groups include dialkylamino groups such as dimethylamino, diethylamino, di(n-propyl)amino, di(isopropyl)amino, di(n-butyl)amino, di(sec-butyl)amino, di(tert-butyl)amino and ethylmethylamino groups.

Among acyclic amino groups, examples of groups of formula (7-X) wherein $R^{73}$ and $R^{74}$ are trihydrocarbylsilyl groups include bis(trialkylsilyl)amino groups such as bis(trimethylsilyl)amino and bis(tert-butyl-dimethylsilyl) amino groups.

Among cycloamino groups, examples of groups of formula (7-X) wherein the group in which a portion of $R^{73}$ and a portion of $R^{74}$ are bonded is a hydrocarbylene group, include 1-aziridinyl, 1-azetidinyl, 1-pyrrolidinyl, 1-piperidinyl, 1-hexamethyleneimino and 1-pyrrolyl groups.

Among cycloamino groups, examples of groups of formula (7-X) wherein the group in which a portion of $R^{73}$ and a portion of $R^{74}$ are bonded is a nitrogen atom-containing hydrocarbylene group, include 1-imidazolyl, 4,5-dihydro-1-imidazolyl, I-imidazolidinyl and 1-piperazinyl groups.

Among cycloamino groups, groups of formula (7-X) wherein the group in which a portion of $R^{73}$ and a portion of $R^{74}$ are bonded is an oxygen atom-containing hydrocarbylene group, include morpholino group.

Examples of hydrocarbylidene groups for $R^{75}$ include ethylidene, propylidene, butylidene, 1-methylethylidene, 1-methylpropylidene and 1,3-dimethylbutylidene groups. The number of carbon atoms of a hydrocarbylidene group is preferably 2 to 20 and more preferably 2 to 6.

Examples of groups represented by formula (7-Y) include acyclic amino groups such as ethylideneamino, 1-methylpropylideneamino, 1,3-dimethylbutylideneamino, 1-methylethylideneamino and 4-N,N-dimethylaminobenzylideneamino groups.

Nitrogen-containing heterocyclic groups for $A^2$ include nitrogen-containing alicyclic heterocyclic groups and nitrogen-containing aromatic heterocyclic groups. A nitrogen-containing alicyclic heterocyclic group is a group formed by removing one hydrogen from the hydrogens bonded to carbon atoms of the heterocyclic ring of a compound having a nitrogen-containing alicyclic heterocyclic ring, where a nitrogen-containing alicyclic heterocyclic ring is an alicyclic heterocyclic ring with a nitrogen atom as a heteroatom among the atoms composing the ring. A nitrogen-containing aromatic heterocyclic group is a group formed by removing one hydrogen from the hydrogens bonded to carbon atoms of the heterocyclic ring of a compound having a nitrogen-containing aromatic heterocyclic ring, where a nitrogen-containing aromatic heterocyclic ring is an aromatic heterocyclic ring with a nitrogen atom as a heteroatom among the atoms composing the ring.

Nitrogen-containing aromatic heterocyclic groups having only a nitrogen atom as a heteroatom among the atoms composing the ring include groups with a pyrrole ring, groups with an imidazole ring, groups with a pyrazole ring, groups with a pyridine ring, groups with a pyridazine ring, groups with a pyrimidine ring and groups with a pyrazine ring.

Examples of groups with a pyrrole ring include 2-pyrrolyl, 3-pyrrolyl, 1-alkyl-2-pyrrolyl and 1-alkyl-3-pyrrolyl groups. Examples of groups with an imidazole ring include 2-imidazolyl, 4-imidazolyl, 5-imidazolyl, 1-alkyl-2-imidazolyl, 1-alkyl-4-imidazolyl and 1-alkyl-5-imidazolyl groups. Examples of groups with a pyridine ring include 2-pyridyl, 3-pyridyl and 4-pyridyl groups. Nitrogen-containing aromatic heterocyclic groups having only a nitrogen atom as a heteroatom among the atoms composing the ring are preferably groups with an imidazole ring or groups with a pyridine ring.

Among the compounds represented by formula (7), examples of compounds wherein $R^{71}$ is a hydrogen atom, s is 1, $R^{72}$ is a phenylene group and $A^2$ is a substituted amino group include 4-dimethylaminostyrene, 4-diethylaminostyrene, 4-dipropylaminostyrene, 4-dibutylaminostyrene, 4-bis(trimethylsilyl)aminostyrene, 4-bis(tert-butyl-dimethylsilyl) aminostyrene, 4-(1-pyrrolidinyl)styrene, 4-(1-piperidinyl) styrene and 4-(1-hexamethyleneimino)styrene.

Among the compounds represented by formula (7), examples of compounds wherein $R^{71}$ is a hydrogen atom, s is 1, $R''$ is a group represented by formula (7-Ra), d1 in formula (7-Ra) is 1 or 2 and $A^2$ is a substituted amino group, include 4-(dimethylaminomethyl)styrene, 4-(diethylaminomethyl)styrene, 4-[bis(trimethylsilyl)aminomethyl]styrene, 4-[bis(tert-butyl-dimethylsilyl)aminomethyl]styrene, 4-(1-pyrrolidinyl)methylstyrene, 4-(1-piperidinyl)methylstyrene, 4-(1-hexamethyleneimino)methylstyrene, 4-[2-(dimethylamino)ethyl]styrene, 4-[2-(diethylamino)ethyl]styrene, 4-{2-[bis(trimethylsilyl)amino]ethyl}styrene, 4-{2-[bis(tert-butyl-dimethylsilyl)amino]ethyl}styrene, 4-[2-(1-pyrrolidinyl)ethyl]styrene, 4-[2-(1-piperidinyl)ethyl]styrene and 4-[2-(1-hexamethyleneimino)ethyl]styrene.

Among the compounds represented by formula (7), examples of compounds wherein $R^{71}$ is a vinyl group, s is 0 and $A^2$ is a substituted amino group include 2-dimethylamino-1,3-butadiene, 2-diethylamino-1,3-butadiene, 2-[bis(trimethylsilyl)amino]-1,3-butadiene, 2-[bis(tert-butyl-dimethylsilyl)amino]-1,3-butadiene, 2-(1-pyrrolidinyl)-1,3-butadiene, 2-(1-piperidinyl)-1,3-butadiene, 2-(1-hexamethyleneimino)-1,3-butadiene, 2-(1-pyrrolyl)-1,3-butadiene and 2-(1-imidazolyl)-1,3-butadiene.

Among the compounds represented by formula (7), examples of compounds wherein $R^{71}$ is a phenyl group, s is 1, $R^{72}$ is a phenylene group and $A^2$ is a substituted amino group include 1-(4-dimethylaminophenyl)-1 1-phenylethylene, 1-(4-diethylaminophenyl)-1-phenylethylene, 1-[4-(1-pyrrolidinyl)phenyl]-1-phenylethylene, 1-[4-(1-piperidinyl) phenyl]-1-phenylethylene, 1-[4-(1-hexamethyleneimino) phenyl]-1-phenylethylene, 1-(4-morpholinophenyl)-1-phenylethylene, 1-{4-[bis(trimethylsilyl)amino]phenyl}-1-phenylethylene and 1-{4-[bis(tert-butyl-dimethylsilyl)amino]phenyl}-1-phenylethylene.

Among the compounds represented by formula (7), examples of compounds wherein $R^{71}$ is a hydrogen atom, s is 0 and $A^2$ is a nitrogen-containing aromatic heterocyclic group include 1-methyl-2-vinylimidazole, 1-methyl-4-vinylimidazole, 1-methyl-5-vinylimidazole, 2-vinylpyridine, 3-vinylpyridine and 4-vinylpyridine.

Among the compounds represented by formula (7), examples of particularly preferred compounds wherein $A^2$ is a substituted amino group or a nitrogen-containing heterocyclic ring include 4-[2-(1-pyrrolidinyl)ethyl]styrene, 3-[2-(1-pyrrolidinyl)ethyl]styrene, 4-vinylpyridine and 3-vinylpyridine.

Examples wherein $A^2$ is a substituted silyl group include groups represented by formula (7-Z).

[Chemical Formula 11]

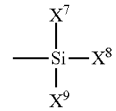

(7-Z)

In formula (7-Z), $X^7$, $X^8$ and $X^9$ each independently represent a substituted amino group or an optionally substituted hydrocarbyl group, with at least one of $X^7$, $X^8$ and $X^9$ being a substituted amino group.

Optionally substituted hydrocarbyl groups for $X^7$, $X^8$ and $X^9$ include hydrocarbyl groups and substituted hydrocarbyl groups.

Examples of hydrocarbyl groups for $X^7$, $X^8$ and $X^9$ include alkyl, alkenyl, alkynyl, aryl and aralkyl groups. Preferred alkyl groups are alkyl groups of 1 to 12 carbon atoms, examples of which include methyl, ethyl, n-propyl, isopropyl, n-butyl, sec-butyl and tert-butyl groups. Preferred alkenyl groups are alkenyl groups of 2 to 12 carbon atoms, with examples including vinyl, allyl, 1-propenyl and isopropenyl groups. Preferred alkynyl groups are alkynyl groups of 2 to 12 carbon atoms, with examples including ethynyl and 2-propynyl groups.

Preferred aryl groups are aryl groups of 6 to 12 carbon atoms, examples of which include phenyl, tolyl and xylyl groups. Preferred aralkyl groups are aralkyl groups of 7 to 13 carbon atoms, with an example being benzyl group. A hydrocarbyl group is preferably an alkyl group.

Substituted hydrocarbyl groups for $X^7$, $X^8$ and $X^9$ include groups having at least one atom selected from the group of atoms consisting of oxygen atoms, nitrogen atoms and silicon atoms.

Examples of substituted hydrocarbyl groups with oxygen atoms include alkoxyalkyl groups such as methoxymethyl, methoxyethyl, ethoxymethyl and ethoxyethyl groups.

Examples of substituted hydrocarbyl groups with nitrogen atoms include dialkylaminoalkyl groups such as dimethylaminomethyl, dimethylaminoethyl, diethylaminomethyl and diethylaminoethyl groups.

Examples of substituted hydrocarbyl groups with silicon atoms include trialkylsilylalkyl groups such as trimethylsilylmethyl, trimethylsilylethyl, triethylsilylmethyl and triethylsilylethyl groups.

The number of carbon atoms of an optionally substituted hydrocarbyl group is preferably 1 to 10 and more preferably 1 to 4.

An optionally substituted hydrocarbyl group is preferably an alkyl group or an alkoxyalkyl group. More preferred as alkyl groups are alkyl groups of 1 to 4 carbon atoms, with methyl and ethyl groups being especially preferred. Alkoxyalkyl groups are preferably alkoxyalkyl groups of 2 to 4 carbon atoms.

Examples of substituted amino groups for $X^7$, $X^8$ and $X^9$ include groups represented by formula (7-X) and groups represented by formula (7-Y).

In formula (7-Z), the substituted amino groups for $X^7$, $X^8$ and $X^9$ are preferably acyclic amino groups, more preferably dialkylamino groups, even more preferably dimethylamino, diethylamino, di(n-propyl)amino or di(n-butyl)amino groups, and most preferably dimethylamino or diethylamino groups.

In formula (7-Z), at least one of $X^7$, $X^8$ and $X^9$ is a substituted amino group, preferably two or more of $X^7$, $X^8$ and $X^9$ are substituted amino groups, and more preferably two of $X^7$, $X^8$ and $X^9$ are substituted amino groups.

Among compounds represented by formula (7), compounds wherein $A^2$ is a substituted silyl group, $R^{71}$ is a hydrogen atom and one of $X^7$, $X^8$ and $X^9$ in formula (7-Z) is a dialkylamino group include the following compounds.

Examples of compounds wherein s in formula (7) is 0 include (dimethylamino)dimethylvinylsilane, (diethylamino)dimethylvinylsilane, (dipropylamino)dimethylvinylsilane, (dibutylamino)dimethylvinylsilane, (dimethylamino)diethylvinylsilane, (diethylamino)diethylvinylsilane, (dipropylamino)diethylvinylsilane and (dibutylamino)diethylvinylsilane.

Examples of compounds wherein s in formula (7) is 1 include (dimethylamino)dimethyl(4-vinylphenyl)silane, (dimethylamino)dimethyl(3-vinylphenyl)silane, (diethylamino)dimethyl(4-vinylphenyl)silane, (diethylamino)dimethyl(3-vinylphenyl)silane, (dipropylamino)dimethyl(4-vinylphenyl)silane, (dipropylamino)dimethyl(3-vinylphenyl)silane, (dibutylamino)dimethyl(4-vinylphenyl)silane, (dibutylamino)dimethyl(3-vinylphenyl)silane, (dimethylamino)diethyl(4-vinylphenyl)silane, (dimethylamino)diethyl(3-vinylphenyl)silane, (diethylamino)diethyl(4-vinylphenyl)silane, (diethylamino)diethyl(3-vinylphenyl)silane, (dipropylamino)diethyl(4-vinylphenyl)silane, (dipropylamino)diethyl(3-vinylphenyl)silane, (dibutylamino)diethyl(4-vinylphenyl)silane and (dibutylamino)diethyl(3-vinylphenyl)silane.

Among compounds represented by formula (7), compounds wherein $R^{71}$ is a hydrogen atom, $A^2$ is a substituted silyl group and two of $X^7$, $X^8$ and $X^9$ in formula (7-Z) are dialkylamino groups include the following compounds.

Examples of compounds wherein s in formula (7) is 0 include bis(dimethylamino)methylvinylsilane, bis(diethylamino)methylvinylsilane, bis(dipropylamino)methylvinylsilane, bis(dibutylamino)methylvinylsilane, bis(dimethylamino)ethylvinylsilane, bis(diethylamino)ethylvinylsilane, bis(dipropylamino)ethylvinylsilane and bis(dibutylamino)ethylvinylsilane.

Examples of compounds wherein s in formula (7) is 1 include bis(dimethylamino)methyl(4-vinylphenyl)silane, bis(dimethylamino)methyl(3-vinylphenyl)silane, bis(diethylamino)methyl(4-vinylphenyl)silane, bis(diethylamino)methyl(3-vinylphenyl)silane, bis(dipropylamino)methyl(4-vinylphenyl)silence, bis(dipropylamino)methyl(3-vinylphenyl)silane, bis(dibutylamino)methyl(4-vinylphenyl)silane, bis(dibutylamino)methyl(3-vinylphenyl)silane, bis(methylamino)ethyl(4-vinylphenyl)silane, bis(dimethylamino)ethyl(3-vinylphenyl)silane, bis(diethylamino)ethyl(4-vinylphenyl)silane, bis(diethylamino)ethyl(3-vinylphenyl)silane, bis(dipropylamino)ethyl(4-vinylphenyl)silane, bis(dipropylamino)ethyl(3-vinylphenyl)silane, bis(dibutylamino)ethyl(4-vinylphenyl)silane and bis(dibutylamino)ethyl(3-vinylphenyl)silane.

Among compounds represented by formula (7), compounds wherein $R^{71}$ is a methyl group, $A^2$ is a substituted silyl group and two of $X^7$, $X^8$ and $X^9$ in formula (7-Z) are dialkylamino groups include the following compounds.

Examples of compounds wherein s in formula (7) is 1 include bis(dimethylamino)methyl(4-isopropenylphenyl)silane, bis(dimethylamino)methyl(3-isopropenylphenyl)silane, bis(diethylamino)methyl(4-isopropenylphenyl)silane, bis(diethylamino)methyl(3-isopropenylphenyl)silane, bis(dipropylamino)methyl(4-isopropenylphenyl)silane, bis(dipropylamino)methyl(3-isopropenylphenyl)silane, bis(dibutylamino)methyl(4-isopropenylphenyl)silane, bis(dibutylamino)methyl(3-isopropenylphenyl)silane, bis(dimethylamino)ethyl(4-isopropenylphenyl)silane, bis(dimethylamino)ethyl(3-isopropenylphenyl)silane, bis(diethylamino)ethyl(4-isopropenylphenyl)silane, bis(diethylamino)ethyl(3-isopropenylphenyl)silane, bis(dipropylamino)ethyl(4-isopropenylphenyl)silane, bis(dipropylamino)ethyl(3-isopropenylphenyl)silane, bis(dibutylamino)ethyl(4-isopropenylphenyl)silane and bis(dibutylamino)ethyl(3-isopropenylphenyl)silane.

Among compounds represented by formula (7), compounds wherein $R^{71}$ is a vinyl group, $A^2$ is a substituted silyl group and two of $X^7$, $X^8$ and $X^9$ in formula (7-Z) are dialkylamino groups include the following compounds.

Examples of compounds wherein s in formula (7) is 0 include bis(dimethylamino)methyl(1-methylene-2-propenyl)silane, bis(diethylamino)methyl(1-methylene-2-propenyl)silane, bis(dipropylamino)methyl(1-methylene-2-propenyl)silane, bis(dibutylamino)methyl(1-methylene-2-propenyl)silane, bis(dimethylamino)ethyl(1-methylene-2-propenyl)silane, bis(diethylamino)ethyl(1-methylene-2-propenyl)silane, bis(dipropylamino)ethyl(1-methylene-2-propenyl)silane and bis(dibutylamino)ethyl(1-methylene-2-propenyl)silane.

Among compounds represented by formula (7), compounds wherein $R^{71}$ is a phenyl group, $A^2$ is a substituted silyl group and two of $X^7$, $X^8$ and $X^9$ in formula (7-Z) are dialkylamino groups include the following compounds.

Examples of compounds wherein s in formula (7) is 1 include 1-{4-[bis(dimethylamino)methylsilyl]phenyl}-1-phenylethylene, 1-{4-[bis(diethylamino)methylsilyl]phenyl}-1-phenylethylene, 1-{4-[bis(dipropylamino)methylsilyl]phenyl}-1-phenylethylene, 1-{4-[bis(dibutylamino)methylsilyl]phenyl}-1-phenylethylene, 1-{4-[bis(dimethylamino)ethylsilyl]phenyl}-1-phenylethylene, 1-{4-[bis(diethylamino)ethylsilyl]phenyl}-1-phenylethylene, 1-{4-[bis(dipropylamino)ethylsilyl]phenyl}-1-phenylethylene and 1-{4-[bis(dibutylamino)ethylsilyl]phenyl}-1-phenylethylene.

Among compounds represented by formula (7), compounds wherein $R^{71}$ is a hydrogen atom, $A^2$ is a substituted silyl group and all three of $X^7$, $X^8$ and $X^9$ in formula (7-Z) are dialkylamino groups include the following compounds.

Examples of compounds wherein s in formula (7) is 0 include tris(dimethylamino)vinylsilane, tris(diethylamino)vinylsilane, tris(dipropylamino)vinylsilane and tris(dibutylamino)vinylsilane.

Examples of compounds wherein s in formula (7) is 1 include tris(dimethylamino) (4-vinylphenyl)silane, tris(dimethylamino) (3-vinylphenyl)silane, tris(diethylamino) (4-vinylphenyl)silane, tris(diethylamino) (3-vinylphenyl)silane, tris(dipropylamino) (4-vinylphenyl)silane, tris(dipropylamino) (3-vinylphenyl)silane, tris(dibutylamino) (4-vinylphenyl)silane and tris(dibutylamino) (3-vinylphenyl)silane.

Among compounds represented by formula (7), compounds wherein $R^{71}$ is a methyl group, $A^2$ is a substituted silyl group and all three of $X^7$, $X^8$ and $X^9$ in formula (7-Z) are dialkylamino groups include the following compounds.

Examples of compounds wherein s in formula (7) is 1 include tris(dimethylamino) (4-isopropenylphenyl)silane, tris(dimethylamino) (3-isopropenylphenyl)silane, tris(diethylamino) (4-isopropenylphenyl)silane, tris(diethylamino) (3-isopropenylphenyl)silane, tris(dipropylamino) (4-isopropenylphenyl)silane, tris(dipropylamino) (3-isopropenylphenyl)silane, tris(dibutylamino) (4-isopropenylphenyl)silane and tris(dibutylamino) (3-isopropenylphenyl)silane.

Among compounds represented by formula (7), compounds wherein $R^{71}$ is a vinyl group, $A^2$ is a substituted silyl group and all three of $X^7$, $X^8$ and $X^9$ in formula (7-Z) are dialkylamino groups include the following compounds.

Examples of compounds wherein s in formula (7) is 0 include tris(dimethylamino) (1-methylene-2-propenyl)silane, tris(diethylamino) (1-methylene-2-propenyl)silane, tris(dipropylamino) (1-methylene-2-propenyl)silane and tris(dibutylamino) (1-methylene-2-propenyl)silane.

Among compounds represented by formula (7), compounds wherein $R^{71}$ is a phenyl group, $A^2$ is a substituted silyl group and all three of $X^7$, $X^8$ and $X^9$ in formula (7-Z) are dialkylamino groups include the following compounds.

Examples of compounds wherein s in formula (7) is 1 include 1-[4-tris(dimethylamino)silylphenyl]-1-phenylethylene, 1-[4-tris(diethylamino)silylphenyl]-1-phenylethylene, 1-[4-tris(di-n-propylamino)methylsilylphenyl]-1-phenylethylene and 1-[4-tris(di-n-butylamino)methylsilylphenyl]-1-phenylethylene.

Preferred compounds as groups represented by formula (7) are compounds wherein two of $X^7$, $X^8$ and $X^9$ in formula (7-Z) are dialkylamino groups, and more preferably compounds wherein two of $X^7$, $X^8$ and $X^9$ in formula (7) are dialkylamino groups, $R^{71}$ is a hydrogen atom and s is 0.

Most preferred as compounds represented by formula (7) wherein $A^2$ is a substituted silyl group are bis(dimethylamino)methylvinylsilane, bis(diethylamino)methylvinylsilane, bis(dipropylamino)methylvinylsilane, bis(dibutylamino)methylvinylsilane, bis(dimethylamino)ethylvinylsilane, bis(diethylamino)ethylvinylsilane, bis(dipropylamino)ethylvinylsilane and bis(dibutylamino)ethylvinylsilane.

The modifying agent added in step 3 may be a compound having a structure represented by formula (6). The compound has a functional group that is reactive with the active end of the polymer. By reacting the polymer with the active end obtained in step 2 with the compound having a structure represented by formula (6), it is possible to obtain a conjugated diene-based polymer having a unit based on the compound with the structure represented by formula (6), at its end.

[Chemical Formula 12]

(6)

In formula (6), $X^1$, $X^2$ and $X^3$ each independently represent a hydrocarbyl group, a hydrocarbyloxy group, a halogen atom or a functional group capable of reacting with the active end of the conjugated diene-based polymer, $R^{61}$ and $R^{62}$ each independently represent a hydrogen atom or a hydrocarbyl group, and when multiple $R^{61}$ and $R^{62}$ groups are present they may be the same or different. $A^1$ represents an organic group having at least one atom selected from the group consisting of oxygen atoms, nitrogen atoms, phosphorus atoms, sulfur atoms and silicon atoms (an organic group including any one or more from among oxygen atoms, nitrogen atoms, phosphorus atoms, sulfur atom and silicon atoms), and $A^1$ may also have a ring structure, with a portion of the structure of $X^3$, $X^2$ or $X^3$ optionally bonded to a portion of $A^1$. In other words, $A^1$ may be bonded to the silicon atom of formula (6) through $X^1$, $X^2$ or $X^3$. The letter "a" represents an integer of 0 to 10.

Examples of hydrocarbyl groups for $X^1$, $X^2$ and $X^3$ include alkyl, aryl, alkenyl and aralkyl groups. Preferred alkyl groups are alkyl groups of 1 to 12 carbon atoms, examples of which include methyl, ethyl, n-propyl, isopropyl, n-butyl, sec-butyl, tert-butyl, n-pentyl, n-hexyl, n-octyl, n-dodecyl, cyclopentyl and cyclohexyl groups. Preferred aryl groups are aryl groups of 6 to 12 carbon atoms, with examples including phenyl, methylphenyl, ethylphenyl, benzyl, tolyl and xylyl groups. Preferred alkenyl groups are alkenyl groups of 2 to 12 carbon atoms, with examples including vinyl, allyl, 1-propenyl and isopropenyl groups. Examples of aralkyl groups include benzyl groups.

Examples of hydrocarbyloxy groups include alkoxy and aryloxy groups. Preferred alkoxy groups are alkoxy groups of 1 to 12 carbon atoms, with examples including methoxy, ethoxy, n-propoxy, isopropoxy, n-butoxy, sec-butoxy and tert-butoxy groups. Preferred aryloxy groups are aryloxy groups of 6 to 12 carbon atoms, with examples including phenoxy and benzyloxy groups. A hydrocarbyloxy group is preferably an alkoxy group, and more preferably a methoxy or ethoxy group.

Examples of halogen atoms include chlorine, bromine and iodine.

Examples for the functional group capable of reacting with the active end of the conjugated diene-based polymer include hydrocarbon groups with epoxy groups and hydrocarbon groups with carbonyl groups.

A hydrocarbyl group for $R^{61}$ and $R^{62}$ is preferably a hydrocarbyl group of 1 to 4 carbon atoms, more preferably an alkyl group of 1 to 4 carbon atoms, and even more preferably a methyl or ethyl group. When multiple $R^{61}$ groups are present, the multiple $R^{61}$ groups may be the same or different, and when multiple Re groups are present the multiple $R^{62}$ groups may be the same or different.

From the viewpoint of increasing fuel efficiency, "a" is preferably 3 or greater, while from the viewpoint of increasing economy during production, it is preferably no greater than 4.

Examples for $A^1$, as an organic group having at least a nitrogen atom, include groups represented by formula (6-1).

[Chemical Formula 13]

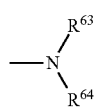

(6-1)

In formula (6-1), $R^{63}$ and $R^{64}$ each independently represent an optionally substituted hydrocarbyl group or trihydrocarbylsilyl group, or a hydrocarbylene group formed by bonding between a portion of $R^{63}$ and a portion of $R^6$, and optionally having at least one atom selected from the group of atoms consisting of silicon atoms, nitrogen atoms and oxygen atoms.

When the group represented by formula (6-1) does not have bonding between a portion of $R^{63}$ and a portion of $R^{64}$ it is an acyclic amino group, and when it has bonding between $R^{63}$ and $R^{64}$, it is a cycloamino group.

An optionally substituted hydrocarbyl group for $R^{63}$ and $R^{64}$ is a hydrocarbyl group, or a substituted hydrocarbyl group.

Examples of hydrocarbyl groups include alkyl groups of 1 to 12 carbon atoms such as methyl, ethyl, n-propyl, isopropyl and n-butyl groups; alkenyl groups of 2 to 12 carbon atoms such as vinyl, allyl and isopropenyl groups; and aryl groups of 6 to 12 carbon atoms such as phenyl and benzyl groups, with alkyl and aryl groups being preferred, and methyl, ethyl or benzyl groups being more preferred.

Examples of substituted hydrocarbyl groups include oxacycloalkyl groups such as oxiranyl and tetrahydrofuranyl groups, with tetrahydrofuranyl being preferred.

Throughout the present specification, an oxacycloalkyl group is a group wherein one $CH_2$ on the alicyclic ring of a cycloalkyl group has been replaced by an oxygen atom.

Examples of trihydrocarbylsilyl groups for $R^{63}$ and $R^{64}$ include trimethylsilyl and tert-butyl-dimethylsilyl groups, with trimethylsilyl being preferred.

A hydrocarbylene group formed by bonding between a portion of $R^{63}$ and a portion of $R^{64}$ and optionally having at least one atom selected from the group of atoms consisting of silicon atoms, nitrogen atoms and oxygen atoms is a hydrocarbylene group, or a hydrocarbylene group having at least one atom selected from the group of atoms consisting of silicon atoms, nitrogen atoms and oxygen atoms (a heteroatom-containing hydrocarbylene group).

Examples of hydrocarbylene groups include alkylene groups of 2 to 12 carbon atoms such as tetramethylene, pentamethylene, hexamethylene and 2,2,4-trimethylhexane-1,6-diyl; among which alkylene groups of 4 to 7 carbon atoms are preferred and a pentamethylene or hexamethylene group is especially preferred.

Examples of heteroatom-containing hydrocarbylene groups include silicon atom-containing hydrocarbylene, nitrogen atom-containing hydrocarbylene and oxygen atom-containing hydrocarbylene groups.

Examples of silicon atom-containing hydrocarbylene groups include the group represented by $—Si(CH_3)_2—CH_2—CH_2—Si(CH_3)_2—$. Examples of nitrogen atom-containing hydrocarbylene groups include the group represented by $—CH=N—CH=CH—$ and the group represented by $—CH=N—CH_2—CH_2—$. Examples of oxygen atom-containing hydrocarbylene groups include the group represented by $—CH_2—CH_2—O—CH_2—CH_2—$.

Examples for $A^1$, as an organic group having at least an oxygen atom, include groups represented by formula (6-2).

[Chemical Formula 14]

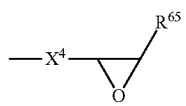

(6-2)

In formula (6-2), $X^4$ represents a hydrocarbylene group of 1 to 6 carbon atoms optionally having an oxygen atom, and $R^{65}$ represents hydrogen or a hydrocarbyl group of 1 to 6 carbon atoms.

Examples of hydrocarbylene groups of 1 to 6 carbon atoms optionally having an oxygen atom, for $X^1$, include unsubstituted hydrocarbylene, and hydrocarbylene groups having an oxygen atom-containing group as a substituent.

Specifically, $X^4$ may be a hydrocarbylene group or a hydrocarbyleneoxy group, and more specifically, it may be an ethylene, propylene, butylene, 1-oxyethylene, 1-oxytrimethylene or 1-oxotetramethylene group. $X^4$ is preferably a 1-oxytrimethylene group.

Examples of hydrocarbyl groups of 1 to 6 carbon atoms for $R^{65}$ include alkyl and aryl groups, and more specifically, methyl, ethyl, n-propyl, isopropyl, n-butyl, sec-butyl, tert-butyl, n-pentyl, neopentyl, isopentyl, n-hexyl, cyclohexyl and phenyl groups. $R^{65}$ is preferably a hydrogen atom or a methyl group.

Examples for $A^1$, as an organic group having at least a sulfur atom, include groups represented by formula (6-3).

[Chemical Formula 15]

(6-3)

In formula (6-3), $R^{66}$ represents a trihydrocarbylsilyl group. Examples of trihydrocarbylsilyl groups include trimethylsilyl, triethylsilyl and tert-butyl-dimethylsilyl groups, with trimethylsilyl or triethylsilyl being preferred.

Examples for $A^1$, as an organic group having at least a silicon atom, include groups represented by formula (6-4). That is, examples of compounds represented by formula (6) include polyorganosiloxane compounds having groups represented by formula (6-4) as $A^1$.

[Chemical Formula 16]

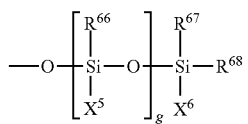

(6-4)

In formula (6-4), $R^{66}$, $R^{67}$ and $R^{68}$ each independently represent a group containing a repeating unit of a hydrocarbyl group or a hydrocarbyleneoxy group, $X^5$ and $X^6$ each independently represent a group containing a repeating unit of a hydrocarbyl, hydrocarbyloxy or hydrocarbyleneoxy group, a halogen atom, or a functional group capable of reacting with the active end of the conjugated diene-based polymer, g represents an integer of 0 to 600, and when multiple R and $X^5$ groups are present, they may be the same or different.

Examples of hydrocarbyl groups for $R^{66}$, $R^{67}$, $R^{68}$, $X^5$ and $X^6$ include alkyl, aryl and aralkyl groups. Preferred alkyl groups are alkyl groups of 1 to 12 carbon atoms, examples of which include methyl, ethyl, n-propyl, isopropyl, n-butyl, sec-butyl, tert-butyl, n-pentyl, n-hexyl, n-octyl, n-dodecyl, cyclopentyl and cyclohexyl groups. Preferred aryl groups are aryl groups of 6 to 12 carbon atoms, with examples including phenyl, methylphenyl, ethylphenyl, tolyl and xylyl groups. Preferred aralkyl groups are aralkyl groups of 7 to 13 carbon atoms, with an example being benzyl group.

The group having a repeating unit of a hydrocarbyleneoxy group for $R^{66}$, $R^{67}$, $R^{68}$, $X^5$ and $X^6$ may be, for example, a group having a repeating unit based on an alkylene glycol. Examples of hydrocarbyleneoxy groups include 1-oxyethylene, 1-oxytrimethylene and 1-oxytetramethylene groups, with 1-oxyethylene being preferred.

Examples of hydrocarbyloxy groups for $X^5$ and $X^6$ include alkoxy and aryloxy groups. Preferred alkoxy groups are alkoxy groups of 1 to 12 carbon atoms, with examples including methoxy, ethoxy, n-propoxy, isopropoxy, n-butoxy, sec-butoxy, tert-butoxy, pentyloxy, hexyloxy, heptyloxy and octyloxy groups. Preferred aryloxy groups are aryloxy groups of 6 to 12 carbon atoms, with examples including phenoxy and benzyloxy groups.

Examples of halogen atoms include chlorine, bromine and iodine.

Examples for the functional group capable of reacting with the active end of the conjugated diene-based polymer include hydrocarbon groups with epoxy groups and hydrocarbon groups with carbonyl groups.

From the viewpoint of handleability, g is preferably 3 to 360, and from the viewpoint of fuel efficiency performance it is preferably 4 to 20.

Among compounds having the structure represented by formula (6), examples of compounds wherein $A^1$ is an acyclic amino group represented by formula (6-1) include [3-(dimethylamino)propyl]trimethoxysilane, [3-(diethylamino)propyl]trimethoxysilane, [3-(dimethylamino)propyl]triethoxysilane, [3-(diethylamino)propyl]triethoxysilane, [3-(ethylmethylamino)propyl]trimethoxysilane, [3-(ethylmethylamino)propyl]triethoxysilane, [3-(dimethylamino)propyl]methyldimethoxysilane, [3-diethylamino)propyl]methyldimethoxysilane, [3-(dimethylamino)propyl]ethyldimethoxysilane, [3-(diethylamino)propyl]ethyldimethoxysilane, [(3-methyl-3-ethylamino)propyl]methyldimethoxysilane, [(3-methyl-3-ethylamino)propyl]ethyldimethoxysilane, [3-(dimethylamino)propyl]methyldiethoxysilane, [3-(diethylamino)propyl]methyldiethoxysilane, [3-(dimethylamino)propyl]ethyldiethoxysilane, [3-(diethylamino)propyl]ethyldiethoxysilane, [3-(ethylmethylamino)propyl]methyldiethoxysilane, [3-(ethylmethylamino)propyl]ethyldiethoxysilane, [3-(benzylmethylamino)propyl]trimethoxysilane, [3-(benzylmethylamino)propyl]triethoxysilane, ({3-[di(methoxymethyl)amino]propyl}trimethoxysilane, {3-[di(methoxyethyl)amino]propyl}trimethoxysilane, {3-[di(methoxymethyl)amino]propyl}triethoxysilane, {3-[di(methoxyethyl)amino]propyl}triethoxysilane, {3-[di(ethoxymethyl)amino]propyl}trimethoxysilane, {3-[di(ethoxyethyl)amino]propyl}trimethoxysilane, {3-[di(ethoxyethyl)amino]propyl}triethoxysilane, {3-[di(ethoxymethyl)amino]propyl}triethoxysilane, {3[N,N-bis(trimethylsilyl)amino]propyl}trimethoxysilane, {3-[N,N-bis(trimethylsilyl)amino]propyl}triethoxysilane, {3-[N,N-bis(t-butyldimethylsilyl)amino]propyl}trimethoxysilane, {3-[N,N-bis(t-butyldimethylsilyl)amino]propyl}triethoxysilane, {3-[N,N-bis(trimethylsilyl)amino]propyl}methyldimethoxysilane, {3-[N,N-bis(trimethylsilyl)amino]propyl}methyldiethoxysilane, {3-[N,N-bis(t-butyldimethylsilyl)amino]propyl}methyldimethoxysilane, {3-[N,N-bis(t-butyldimethylsilyl)amino]propyl}methyldiethoxysilane, [3-(ethylmethylamino)propyl]trimethoxysilane, [3-(ethylmethylamino)propyl]triethoxysilane, [3-(ethylmethylamino)propyl]methyldimethoxysilane, [3-(ethylmethylamino)propyl]ethyldimethoxysilane, [3-(ethylmethylamino)propyl]methyldiethoxysilane and [3-(ethylmethylamino)propyl]ethyldiethoxysilane.

Among compounds having the structure represented by formula (6), compounds wherein $A^1$ is an acyclic amino group represented by formula (6-1) are preferably [3-(dimethylamino)propyl]trimethoxysilane, [3-(diethylamino)propyl]trimethoxysilane, [3-(dimethylamino)propyl]triethoxysilane or [3-(diethylamino)propyl]triethoxysilane, from the viewpoint of increasing fuel efficiency.

Among compounds having the structure represented by formula (6), examples of compounds wherein $A^1$ is a cycloamino group represented by formula (6-1) include 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane and 3-hexamethyleneiminopropylethyldiethoxysilane.

Among compounds having the structure represented by formula (6), compounds wherein $A^1$ is a cycloamino group represented by formula (6-1) are preferably N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole or N-(3-triethoxysilylpropyl)-4,5-imidazole, from the viewpoint of increasing fuel efficiency.

Among compounds having the structure represented by formula (6), examples of compounds wherein $A^1$ is a group represented by formula (6-2) include 3-glycidoxypropyltrimethoxysilane, 3-glycidoxypropyltriethoxysilane, 3-glycidoxypropylmethyldimethoxysilane, 3-glycidoxypropylethyldimethoxysilane, 3-glycidoxypropylmethyldiethoxysilane and 3-glycidoxypropylethyldiethoxysilane.

Among compounds having the structure represented by formula (6), a compound wherein $A^1$ is a group represented by formula (6-2) is preferably 3-glycidoxypropyltrimethoxysilane, from the viewpoint of increasing fuel efficiency, and from the viewpoint of ready availability of the compound and increasing long-term storage stability.

Among compounds having the structure represented by formula (6), examples of compounds wherein $A^1$ is a group represented by formula (6-3) include S-trimethylsilylmercaptopropyltrimethoxysilane, S-trimethylsilylmercaptopropyltriethoxysilane, S-trimethylsilylmercaptopropylmethyldimethoxysilane,
S-trimethylsilylmercaptopropylmethyldiethoxysilane, S-triethylsilylmercaptopropyltrimethoxysilane, S-triethylsilylmercaptopropyltriethoxysilane, S-triethylsilylmercaptopropylmethyldimethoxysilane and S-triethylsilylmercaptopropylmethyldiethoxysilane.

Among compounds having the structure represented by formula (6), examples of compounds wherein $A^1$ is a group represented by formula (6-4) include diglycidoxypolydimethylsiloxane, dimethyl(methoxy-methylsiloxane)polydimethylsiloxane, dimethyl(acetoxy-methylsiloxane)polydimethylsiloxane, diglycidylpolysiloxane and dichloropolydimethylsiloxane.

A compound having the structure represented by formula (6) is preferably a compound wherein $A^1$ is a group represented by formula (6-2), (6-3) or (6-4), from the viewpoint of obtaining a conjugated diene-based polymer with even more excellent processability and durability.

Examples of compounds having the structure represented by formula (6) other than the compounds mentioned above include tris[(alkoxysilyl)alkyl] isocyanurate compounds such as tris[3-(trimethoxysilyl)propyl] isocyanurate, tris[3-(triethoxysilyl)propyl] isocyanurate, tris[3-(tripropoxysilyl)propyl] isocyanurate and tris[3-(tributoxysilyl)propyl] isocyanurate. Of these, a compound represented by formula (6) is preferably tris[3-(trialkoxysilyl)propyl]isocyanurate, more preferably tris[3-(trialkoxysilyl)propyl] isocyanurate in which the alkoxy group is an alkoxy group of 1 to 4 carbon atoms, and even more preferably tris[3-(trimethoxysilyl)propyl] isocyanurate.

Examples of compounds having the structure represented by formula (6), other than the compounds mentioned above, include 1,4-bis[3-(trimethoxysilyl)propyl]piperazine, 1,4-bis[3-(triethoxysilyl)propyl]piperazine, bis[3-(trimethoxysilyl)propyl]-N-trimethylsilylamine, bis[3-(triethoxysilyl)propyl]-N-trimethylsilylamine, bis[3-(trimethoxysilyl)propyl]methylamine, bis[3-(triethoxysilyl)propyl]methylamine, bis[3-(trimethoxysilyl)propyl]ethylamine, bis[3-(triethoxysilyl)propyl]ethylamine, tris(trimethoxysilylmethyl)amine, tris(triethoxysilylmethyl)amine, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, N-[2-(trimethoxysilanyl)-ethyl]-N,N',N'-trimethylethane-1,2-diamine, 2-[3-(trimethoxysilyl)propyl]-1,3-dimethylimidazolidine and 2-[3-(trimethoxysilyl)propyl]-1,3-(bistrimethylsilyl)imidazolidine.

A compound having the structure represented by the following formula (8) may also be used as the modifying agent to be added in step 3. By reacting the polymer with the active end obtained in step 2 with the compound having a structure represented by formula (8), it is possible to obtain a conjugated diene-based polymer having a unit based on the compound with the structure represented by formula (8), at its end.

[Chemical Formula 17]

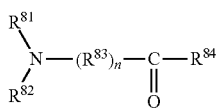

(8)

$R^{81}$ and $R^{82}$ in formula (8) each independently represent an optionally substituted hydrocarbyl group, or they represent a hydrocarbylene group wherein a portion of $R^{81}$ and a portion of $R^{82}$ are bonded, optionally having a nitrogen atom and/or an oxygen atom, or $R^{84}$ represents an optionally substituted hydrocarbyl group or a hydrogen atom, or a portion of either $R^{81}$ or $R^{82}$ and a portion of $R^{84}$ are bonded together to form a hydrocarbylene group, which optionally has a nitrogen atom and/or an oxygen atom. $R^{83}$ represents a divalent group, and n is 0 or 1.

An optionally substituted hydrocarbyl group for $R^{81}$, $R^{82}$ and $R^{84}$ is a hydrocarbyl group, or a substituted hydrocarbyl group. Examples of substituted hydrocarbyl groups include hydrocarbyl groups substituted with hydrocarbyloxy groups, and hydrocarbyl groups substituted with substituted amino groups.

Examples of hydrocarbyl groups include alkyl, alkenyl, alkynyl, aryl and aralkyl groups. Preferred alkyl groups are alkyl groups of 1 to 12 carbon atoms, examples of which include methyl, ethyl, n-propyl, isopropyl, n-butyl, sec-butyl, tert-butyl, n-pentyl, n-hexyl, n-octyl, n-dodecyl, cyclopentyl and cyclohexyl groups. Preferred alkenyl groups are alkenyl groups of 2 to 12 carbon atoms, with examples including vinyl, allyl, 1-propenyl and isopropenyl groups. Preferred alkynyl groups are alkynyl groups of 2 to 12 carbon atoms, examples of which include ethynyl and 2-propynyl groups. Preferred aryl groups are aryl groups of 6 to 12 carbon atoms, with examples including phenyl, methylphenyl, ethylphenyl, benzyl, tolyl and xylyl groups. Preferred aralkyl groups are aralkyl groups of 7 to 13 carbon atoms, with an example being benzyl group.

Examples of hydrocarbyl groups substituted with hydrocarbyloxy groups include alkoxyalkyl groups such as methoxymethyl, ethoxymethyl and ethoxyethyl groups.

Examples of hydrocarbyl groups substituted with a substituted amino group include (N,N-dialkylamino)alkyl groups such as N,N-dimethylaminomethyl, 2-(N,N-dimethylamino)ethyl, 2-(N,N-diethylamino)ethyl, 3-(N,N-dimethylamino)propyl and 3-(N,N-diethylamino)propyl groups; (N,N-dialkylamino)aryl groups such as 4-(N,N-dimethylamino)phenyl, 3-(N,N-dimethylamino)phenyl, 4-(N,N-diethylamino)phenyl and 3-(N,N-diethylamino)phenyl groups; (N,N-dialkylamino)alkylaryl groups such as 4-(N,N-dimethylamino)methylphenyl and 4-[2-(N,N-dimethylamino)ethyl]phenyl groups; cycloamino group-substituted alkyl groups such as 3-(1-pyrrolidinyl)propyl, 3-(1-piperidinyl)propyl and 3-(1-imidazolyl)propyl groups; cycloamino group-substituted aryl groups such as 4-(1-pyrrolidinyl)phenyl, 4-(1-piperidinyl)phenyl and 4-(1-imidazolyl)phenyl groups; and cycloamino group-substituted alkylaryl groups such as 4-[2-(1-pyrrolidinyl)ethyl]phenyl, 4-[2-(1-piperidinyl)ethyl]phenyl and 4-[2-(1-imidazolyl)ethyl]phenyl groups.

A hydrocarbylene group that is a group formed having a portion of $R^{81}$ bonded with a portion of $R^{82}$ or a group formed having a portion of $R^{81}$ or R bonded with a portion of R, and optionally having a nitrogen atom and/or an oxygen atom, is a hydrocarbylene group or a hydrocarbylene group with a nitrogen atom and/or an oxygen atom.

Examples of hydrocarbylene groups include alkylene groups such as trimethylene, tetramethylene, pentamethylene, hexamethylene and 2,2,4-trimethylhexane-1,6-diyl; and arylene groups such as 1,4-phenylene. Examples of hydrocarbylene groups optionally having nitrogen atoms and/or an oxygen atoms include the group represented by —CH=N—CH=CH—, the group represented by —CH=N—CH$_2$—

$CH_2$— and groups represented by —$(CH_2)$—O—$(CH_2)$— (where t and u are each an integer of 1 or greater).

Examples of divalent groups for R include hydrocarbylene groups, hydrocarbylene groups with a nitrogen atom and/or an oxygen atom, groups formed by bonding of a hydrocarbylene group with an oxygen atom, and groups formed by bonding of a hydrocarbylene group with a group represented by —$NR^{85}$— (where $R^{85}$ represents a hydrocarbyl group or a hydrogen atom).

Examples of hydrocarbylene groups include groups formed by bonding of an alkylene, alkenediyl, arylene or arylene group with an alkylene group (hereunder also referred to as "arylene-alkylene group"). Examples of alkylene groups include methylene, ethylene, propylene, tetramethylene, pentamethylene, hexamethylene, heptamethylene, octamethylene and 2,2,4-trimethylhexane-1,6-diyl groups. Examples of alkenediyl groups include pentane-2-ene-1,5-diyl groups. Examples of arylene groups include phenylene, naphthylene and biphenylene groups. Examples of arylene-alkylene groups include phenylene-alkylene, naphthylene-alkylene and biphenylene-alkylene groups.

Examples of hydrocarbylene groups with a nitrogen atom and/or an oxygen atom include the group represented by —CH=N—CH=CH—, the group represented by —CH=N—$CH_2$—CH, and groups represented by —$(CH_2)$—O—$(CH_2)$— (where t and u are each an integer of 1 or greater). Examples of groups formed by bonding of a hydrocarbylene group with an oxygen atom include groups represented by —$(CH_2)$—O— (where u is an integer of 1 or greater).

Examples of groups formed by bonding of a hydrocarbylene group with a group represented by —$NR^{85}$— (where $R^{85}$ represents a hydrocarbyl group or a hydrogen atom), include groups represented by —$(CH_2)$v-NR— (where R represents a hydrocarbyl group of 1 to 10 carbon atoms or a hydrogen atom, and v is an integer of 1 or greater).

Preferred compounds represented by formula (8) are compounds wherein n is 0 and $R^{84}$ represents an optionally substituted hydrocarbyl group or a hydrogen atom, i.e. compounds represented by the following formula (8-1); compounds wherein n is 0 and that represent a hydrocarbylene group wherein a portion of $R^{81}$ and a portion of R are bonded, or a group formed by bonding of a hydrocarbylene group with a group represented by —$NR^{85}$— (where $R^{85}$ represents a hydrocarbyl group or a hydrogen atom), i.e. compounds represented by the following formula (8-2); compounds wherein n is 1 and $R^{83}$ represents a hydrocarbylene group, i.e. compounds represented by the following formula (8-3); and compounds wherein n is 1 and $R^{83}$ represents a group formed by bonding of a hydrocarbylene group with an oxygen atom or a group formed by bonding of a hydrocarbylene group with a group represented by —$NR^{85}$— (where $R^{85}$ represents a hydrocarbyl group or a hydrogen atoms), i.e. compounds represented by the following formula (8-4).

[Chemical Formula 18]

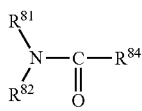

(8-1)

In formula (8-1), $R^{81}$, $R^{82}$ and $R^{84}$ have the same definitions as $R^{81}$, $R^{82}$ and $R^{84}$ in formula (8).

[Chemical Formula 19]

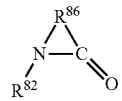

(8-2)

In formula (8-2), $R^{82}$ has the same definition as $R^{82}$ in formula (8). R represents a hydrocarbylene group, or a group formed by bonding of a hydrocarbylene group with a group represented by —$NR^{85}$— (where $R^{85}$ represents a hydrocarbyl group or a hydrogen atom).

[Chemical Formula 20]

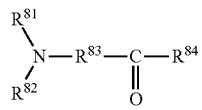

(8-3)

In formula (8-3), $R^{81}$, $R^{82}$ and $R^{84}$ have the same definitions as $R^{81}$, $R^{82}$ and $R^{84}$ in formula (8). $R^{83}$ represents a hydrocarbylene group.

[Chemical Formula 21]

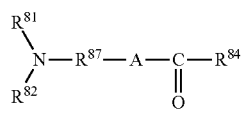

(8-4)

In formula (8-4), $R^{81}$, $R^{82}$ and $R^{84}$ have the same definitions as $R^{81}$, $R^{82}$ and $R^{84}$ in formula (8). $R^{87}$ represents a hydrocarbylene group, and A represents an oxygen atom or —$NR^{85}$— (where $R^{85}$ represents a hydrocarbyl group or a hydrogen atom).

$R^{81}$ and $R^{82}$ in formula (8-1) preferably each independently represent a hydrocarbyl group of 1 to 10 carbon atoms, or represent a hydrocarbylene group of 3 to 10 carbon atoms, or a nitrogen atom-containing hydrocarbylene group of 3 to 10 carbon atoms, formed by bonding of a portion of $R^{81}$ and a portion of $R^{82}$, more preferably each independently represent an alkyl group of 1 to 10 carbon atoms or an aryl group of 6 to 10 carbon atoms, or an alkylene group of 3 to 10 carbon atoms, formed by bonding of a portion of $R^{81}$ and a portion of $R^{82}$, or the group represented by —CH=N—CH=CH—, or the group represented by CH=N—$CH_2$—$CH_2$, even more preferably each independently represent an alkyl group of 1 to 6 carbon atoms, and yet more preferably each independently represent a methyl group or an ethyl group.

$R^{84}$ in formula (8-1) preferably represents a hydrocarbyl group or a hydrogen atom, more preferably it represents a hydrocarbyl group of 1 to 10 carbon atoms or a hydrogen atom, even more preferably it represents an alkyl group of 1 to 6 carbon atoms or a hydrogen atom, and yet more preferably it represents a hydrogen atom, a methyl group or an ethyl group.

Among compounds represented by formula (8-1), examples of compounds wherein $R^{84}$ represents a hydrocarbyl group include N,N-dihydrocarbylacetamides such as N,N-dimethylacetamide, N,N-diethylacetamide and N-methyl-N-ethylacetamide; N,N-dihydrocarbylacrylamides such as N-dimethylacrylamide, N,N-diethylacrylamide and N-methyl-N-ethylacrylamide; and N,N-dihydrocarbylmethacrylamides such as N,N-dimethylmethacrylamide, N,N-diethylmethacrylamide and N-methyl-N-ethylmethacrylamide.

Among compounds represented by formula (8-1), examples of compounds wherein $R^{84}$ represents a hydrogen atom include N,N-dihydrocarbylformamides such as N,N-dimethylformamide, N,N-diethylformamide and N-methyl-N-ethylformamide.

Examples of hydrocarbylene groups for R in formula (8-2) include alkylene, alkenediyl, arylene and groups formed by bonding of an arylene group with an alkylene group (hereunder also referred to as "arylene-alkylene group"). Preferred alkylene groups are alkylene groups of 1 to 12 carbon atoms, examples of which include methylene, ethylene, propylene, tetramethylene, pentamethylene, hexamethylene, heptamethylene, octamethylene and 2,2,4-trimethylhexane-1,6-diyl groups. Preferred alkenediyl groups are alkenediyl groups of 4 to 12 carbon atoms, examples of which include pentane-2-ene-1,5-diyl groups, and preferred arylene groups are arylene groups of 6 to 12 carbon atoms, examples of which include phenylene, naphthylene and biphenylene groups. Examples of arylene-alkylene groups include phenylene-alkylene, naphthylene-alkylene and biphenylene-alkylene groups. Examples of groups formed by bonding of a hydrocarbylene group with a group represented by —$NR^{85}$— (where $R^{85}$ represents a hydrocarbyl group or a hydrogen atom), for R, include groups represented by —$(CH_2)_v$—NR— (where R represents a hydrocarbyl group of 1 to 10 carbon atoms or a hydrogen atom, and v is an integer of 1 or greater).

R in formula (8-2) preferably represents a hydrocarbyl group of 1 to 10 carbon atoms, more preferably it represents an alkyl group of 1 to 10 carbon atoms or an aryl group of 6 to 10 carbon atoms, even more preferably it represents an alkyl group of 1 to 6 carbon atoms or a phenyl group, and yet more preferably it represents a methyl, ethyl or phenyl group.

$R^{86}$ in formula (8-2) preferably represents a hydrocarbylene group of 1 to 10 carbon atoms, or a group formed by bonding of a hydrocarbylene group of 1 to 10 carbon atoms with a group represented by —NR— (where $R^{88}$ represents a hydrocarbyl group of 1 to 10 carbon atoms or a hydrogen atom), more preferably it represents an alkylene group of 3 to 6 carbon atoms or a group represented by —$(CH_2)_w$—NR— (where R represents a hydrocarbyl group of 1 to 10 carbon atoms, and w is an integer of 2 to 5), and even more preferably it represents trimethylene, tetramethylene, pentamethylene, or a group represented by —$(CH_2)_2$—N($CH_3$)—.

Among compounds represented by formula (8-2), examples of compounds wherein $R^{86}$ represents a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone and N-methyl-5-methyl-2-pyrrolidone; N-hydrocarbyl-2-piperidones such as N-methyl-2-piperidone, N-vinyl-2-piperidone and N-phenyl-2-piperidone; N-hydrocarbyl-ε-caprolactams such as N-methyl-ε-caprolactam and N-phenyl-ε-caprolactam; and N-hydrocarbyl-ω-laurylolactams such as N-methyl-ω-laurylolactam and N-vinyl-ω-laurylolactam. Among these, N-methyl-2-pyrrolidone, N-phenyl-2-pyrrolidone, N-methyl-ε-caprolactam and N-phenyl-ε-caprolactam are preferred, and N-phenyl-2-pyrrolidone and N-methyl-ε-caprolactam are more preferred.

Among compounds represented by formula (8-2), examples of compounds wherein $R^{86}$ is a group formed by bonding of a hydrocarbylene group with a group represented by —$NR^{85}$— (where $R^{85}$ is a hydrocarbyl group or a hydrogen atom), include 1,3-dihydrocarbyl-2-imidazolidinones such as 1,3-dimethyl-2-imidazolidinone, 1,3-diethyl-2-imidazolidinone, 1,3-divinyl-2-imidazolidinone and 1-methyl-3-ethyl-2-imidazolidinone. Among these, 1,3-dimethyl-2-imidazolidinone and 1,3-diethyl-2-imidazolidinone are preferred, and 1,3-dimethyl-2-imidazolidinone is more preferred.

$R^{83}$ in formula (8-3) preferably represents a hydrocarbylene group of 1 to 10 carbon atoms, more preferably it represents an alkylene group of 1 to 10 carbon atoms or an arylene group of 6 to 10 carbon atoms, even more preferably it represents an alkylene group of 1 to 6 carbon atoms or a phenylene group, and yet more preferably it represents an ethylene, trimethylene or 1,4-phenylene group.

$R^{84}$ in formula (8-3) preferably represents a hydrocarbyl group of 1 to 10 carbon atoms, or a hydrocarbyl group of 3 to 10 carbon atoms substituted with a dialkylamino group, more preferably it represents an alkyl group of 1 to 6 carbon atoms, an aryl group of 6 to 10 carbon atoms, a dialkylaminoalkyl group of 3 to 6 carbon atoms or a dialkylaminoaryl group of 8 to 10 carbon atoms, and even more preferably it represents a methyl group, an ethyl group, a dialkylaminomethyl group of 3 to 6 carbon atoms, a dialkylaminoethyl group of 4 to 6 carbon atoms, a phenyl group or a dialkylaminophenyl group of 8 to 10 carbon atoms.

$R^{81}$ and $R^{82}$ in formula (8-3) each independently represent a hydrocarbyl group of 1 to 10 carbon atoms, or represent a hydrocarbylene group of 3 to 10 carbon atoms or a hydrocarbylene group of 3 to 10 carbon atoms with a nitrogen atom, wherein a portion of $R^{81}$ and a portion of $R^{82}$ are bonded, more preferably each independently represent an alkyl group of 1 to 10 carbon atoms or an aryl group of 6 to 10 carbon atoms, or $R^{81}$ is bonded to $R^{82}$, and the group with $R^{81}$ bonded to $R^{82}$ represents an alkylene group of 3 to 10 carbon atoms, the group represented by —CH=N—CH=CH—, the group represented by —CH=N—$CH_2$—$CH_2$— or the group represented by —$(CH_2)_2$—O—$(CH_2)_2$—, even more preferably each independently represent an alkyl group of 1 to 6 carbon atoms, or an alkylene group of 3 to 6 carbon atoms, the group —CH=N—CH=CH— or the group —CH=N—$CH_2$—$CH_2$—, formed by bonding of a portion of $R^{81}$ and a portion of $R^2$, and yet more preferably each independently represent a methyl or ethyl group, or a tetramethylene or hexamethylene group or the group —CH=N—CH=CH—, formed by bonding of a portion of $R^{81}$ and a portion of $R^{82}$.

Among compounds represented by formula (8-3), examples of compounds wherein $R^{83}$ represents an arylene group and $R^{84}$ represents an alkyl group include 4-(N,N-dihydrocarbylamino)acetophenones such as 4-(N,N-dimethylamino)acetophenone, 4-(N-methyl-N-ethylamino)acetophenone and 4-(N,N-diethylamino)acetophenone; and 4-cyclic aminoacetophenone compounds such as 4'-(imidazol-1-yl)acetophenone. Of these, 4-cyclic aminoacetophenone compounds are preferred, and 4'-(imidazol-1-yl)acetophenone is more preferred.

Among compounds represented by formula (8-3), examples of compounds wherein $R^{83}$ represents a hydrocarbylene group and $R^{84}$ represents a hydrocarbyl or substituted hydrocarbyl group include bis(dihydrocarbylaminoalkyl)ketones such as 1,7-bis(methylethylamino)-4-heptanone and 1,3-bis(diphenylamino)-2-propanone. Examples of compounds wherein $R^{83}$ represents an arylene group and $R^{84}$ represents an aryl or substituted aryl group include 4-(dihydrocarbylamino)benzophenones such as 4-N,N-dimethylaminobenzophenone, 4-N,N-diethylaminobenzophenone, 4-N,N-di-t-butylaminobenzophenone and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone and 4,4'-bis(diphenylamino)benzophenone. Of these, 1,7-bis(methylethylamino)-4-heptanone, 4-N,N-dimethylaminobenzophenone, 4-N,N-diethylaminobenzophenone, 4,4'-bis(dimethylamino)benzophenone and 4,4'-bis(diethylamino)benzophenone are preferred, and 4-N,N-dimethylaminobenzophenone, 4-N,N-diethylaminobenzophenone, 4,4'-bis(dimethylamino)benzophenone and 4,4'-bis(diethylamino)benzophenone are more preferred.

In formula (8-4), the oxygen atom or $NR^{84}$— (where $R^{85}$ represents a hydrocarbyl group or a hydrogen atom) as A is preferably an oxygen atom or —NR— (where R represents a hydrocarbylene group of 1 to 5 carbon atoms or a hydrogen atom), more preferably an oxygen atom or a group represented by —NH—, and even more preferably a group represented by —NH—.

Examples of hydrocarbylene groups for $R^{87}$ in formula (8-4) include alkylene, alkenediyl and arylene groups, and groups formed by bonding of an arylene group with an alkylene group (hereunder also referred to as "arylene-alkylene group"). Preferred alkylene groups are alkylene groups of 1 to 12 carbon atoms, examples of which include methylene, ethylene, propylene, tetramethylene, pentamethylene, hexamethylene, heptamethylene, octamethylene and 2,2,4-trimethylhexane-1,6-diyl groups. Examples of alkenediyl groups include alkenediyl groups of 4 to 12 carbon atoms, an example of which is pentane-2-ene-1,5-diyl group. Examples of arylene groups include arylene groups of 6 to 12 carbon atoms, examples of which include phenylene, naphthylene and biphenylene groups. Examples of arylene-alkylene groups include phenylene-alkylene, naphthylene-alkylene and biphenylene-alkylene groups.

$R^{84}$ in formula (8-4) preferably represents a hydrocarbyl group of 1 to 10 carbon atoms, more preferably it represents an alkenyl group of 2 to 5 carbon atoms, even more preferably it represents a vinyl or isopropenyl group, and yet more preferably it represents a vinyl group.

$R^{87}$ in formula (8-4) preferably represents a hydrocarbylene group of 1 to 10 carbon atoms, more preferably it represents an alkylene group of 1 to 6 carbon atoms, even more preferably it represents an ethylene or trimethylene group, and yet more preferably it represents a trimethylene group.

$R^{81}$ and $R^{82}$ in formula (8-4) preferably each independently represent a hydrocarbyl group of 1 to 10 carbon atoms, or represent a hydrocarbylene group of 3 to 10 carbon atoms or a hydrocarbylene group of 3 to 10 carbon atoms with a nitrogen atom, wherein a portion of $R^{81}$ and a portion of $R^{82}$ are bonded, more preferably each independently represent an alkyl group of 1 to 10 carbon atoms or an aryl group of 6 to 10 carbon atoms, or represent an alkylene group of 3 to 10 carbon atoms, the group represented by —CH=N—CH=CH—, the group represented by —CH=N—CH$_2$—CH$_2$— or the group represented by —(CH$_2$)$_2$—O—(CH$_2$)$_2$—, formed by bonding of a portion of $R^{81}$ and a portion of $R^{82}$, even more preferably each independently represent an alkyl group of 1 to 6 carbon atoms, or an alkylene group of 3 to 6 carbon atoms, the group —CH=N—CH=CH— or the group —CH=N—CH$_2$—CH$_2$—, formed by bonding of a portion of $R^{81}$ and a portion of $R^{82}$, and yet more preferably each independently represent a methyl or ethyl group, or a tetramethylene or hexamethylene group or the group —CH=N—CH=CH—, formed by bonding of a portion of $R^{81}$ and a portion of R.

Among compounds represented by formula (8-4), examples of compounds wherein A represents an oxygen atom include 2-(dihydrocarbylamino)ethyl acrylates such as 2-(dimethylamino)ethyl acrylate and 2-(diethylamino)ethyl acrylate; 3-(dihydrocarbylamino)propyl acrylates such as 3-(dimethylamino)propyl acrylate; 2-(dihydrocarbylamino)ethyl methacrylates such as 2-(dimethylamino)ethyl methacrylate and 2-(diethylamino)ethyl methacrylate; and 3-(dihydrocarbylamino)propyl methacrylates such as 3-(dimethylamino)propyl methacrylate. Of these, 2-(dimethylamino)ethyl acrylate, 3-(dimethylamino)propyl acrylate, 2-(dimethylamino)ethyl methacrylate and 3-(dimethylamino)propyl methacrylate are preferred, and 2-(dimethylamino)ethyl acrylate and 3-(dimethylamino)propyl acrylate are more preferred.

Among compounds represented by formula (8-4), examples of compounds wherein A represents the group —$NR^{85}$— (where $R^{85}$ is a hydrocarbylene group or a hydrogen atom) include N-(2-dihydrocarbylaminoethyl)acrylamides such as N-(2-dimethylaminoethyl)acrylamide and N-(2-diethylaminoethyl)acrylamide; N-(3-dihydrocarbylaminopropyl)acrylamides such as N-(3-dimethylaminopropyl)acrylamide and N-(3-diethylaminopropyl)acrylamide; N-(4-dihydrocarbylaminobutyl)acrylamides such as N-(4-dimethylaminobutyl)acrylamide and N-(4-diethylaminobutyl)acrylamide; N-(2-dihydrocarbylaminoethyl)methacrylamides such as N-(2-dimethylaminoethyl)methacrylamide and N-(2-diethylaminoethyl)methacrylamide; N-(3-dihydrocarbylaminopropyl)methacrylamides such as N-(3-dimethylaminopropyl)methacrylamide and N-(3-diethylaminopropyl)methacrylamide; and N-(4-dihydrocarbylaminobutyl)methacrylamides such as N-(4-dimethylaminobutyl)methacrylamide and N-(4-diethylaminobutyl)methacrylamide. Of these, N-(2-dimethylaminoethyl)acrylamide, N-(3-dimethylaminopropyl)acrylamide and N-(4-dimethylaminobutyl)acrylamide are preferred, and N-(2-dimethylaminoethyl)acrylamide and N-(3-dimethylaminopropyl)acrylamide are more preferred.

The conjugated diene-based polymer of this embodiment preferably has a monomer unit derived from a compound having the structure represented by formula (7), and it may have a monomer unit derived from one or more modifying agents selected from the group consisting of compounds having the structure represented by formula (6) and compounds having the structure represented by formula (8).

The conjugated diene-based polymer may be produced in the presence of an agent that adjusts the number of vinyl bonds in the monomer unit from the conjugated diene compound, or an agent that adjusts the distribution of monomer units from the conjugated diene compound, monomer units from the aromatic vinyl compound and monomer units from the other compounds, in the conjugated diene-based polymer chain (such agents will be referred to collectively as "adjusting agent").

The adjusting agent used may be an ether compound, tertiary amine, phosphine compound, alkali metal alkoxide or alkali metal phenoxide. Examples of ether compounds include cyclic ethers such as tetrahydrofuran, tetrahydropyran and 1,4-dioxane; aliphatic monoethers such as diethyl ether and dibutyl ether, aliphatic diethers such as ethyleneglycol dimethyl ether, ethyleneglycol diethyl ether and ethyleneglycol dibutyl ether, aliphatic triethers such as diethyleneglycol diethyl ether and diethyleneglycol dibutyl ether, and aromatic ethers such as diphenyl ether, anisole, 1,2-dimethoxybenzene and 3,4-dimethoxytoluene. Examples of tertiary amines include triethylamine, tripropylamine, tributylamine, 1,1,2,2-tetramethylethylenediamine, N,N-diethylaniline, pyridine and quinoline. Examples of phosphine compounds include trimethylphosphine, triethylphosphine and triphenylphosphine. Examples of alkali metal alkoxides include sodium-tert-butoxide, potassium-tert-butoxide, sodium-tert-pentoxide and potassium-tert-pentoxide. Examples of alkali metal phenoxides include sodium phenoxide and potassium phenoxide. Any of these compounds may be used alone or in combinations of two or more.

When producing a modified conjugated diene-based polymer of this embodiment, a coupling agent may be added to the polymerization solution between the period after initial polymerization of the monomer until polymerization is terminated.

Examples of coupling agents include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane and diethoxydiethylsilane.

The amount of coupling agent added is not particularly restricted, but when the polymerization initiator includes an alkali metal, it is preferably 0.03 mol or greater and more preferably 0.05 mol or greater per mole of alkali metal, in order to increase the processability of the conjugated diene polymer that is produced. The amount of coupling agent added is also preferably no greater than 0.4 mol and more preferably no greater than 0.3 mol per mole of alkali metal, in order to increase the fuel efficiency of the conjugated diene polymer composition.

The conjugated diene-based polymer can be recovered from a hydrocarbon solution of the conjugated diene-based polymer by a publicly known recovery method, such as a method of adding a coagulant to the hydrocarbon solution of the conjugated diene-based polymer or a method of adding steam to the hydrocarbon solution of the conjugated diene-based polymer. The recovered conjugated diene-based polymer may be dried using a publicly known dryer, such as a hand dryer or extrusion dryer.

[Polymer Composition]

A reinforcing material may be combined with the conjugated diene-based polymer of this embodiment to prepare a polymer composition.

Examples of reinforcing materials include silica, calcium silicate, aluminum silicate, aluminum hydroxide and carbon black. Any of these reinforcing materials may be used alone or in combinations of two or more.

Examples of silica include dry silica (silicic anhydride), wet silica (hydrous silicic acid), colloidal silica and precipitated silica. The BET specific surface area of the silica is preferably 50 m$^2$/g to 250 m$^2$/g. The BET specific surface area is measured according to ASTM D1993-03. Commercial silica products that may be used include "ULTRASIL VN3-G", trade name of Evonik Co., "VN3", "AQ", "ER" and "RS-150", trade names of Tosoh Silica Corp., and "Zeosil 1115 MP" and "Zeosil 1165 MP", trade names of Rhodia. Different types of silica may be used, either alone or in combinations of two or more.

Examples of carbon blacks include furnace black, acetylene black, thermal black, channel black and graphite. Examples of channel black include EPC, MPC and CC. Examples of furnace carbon black include SAF, ISAF, HAF, MAF, FEF, SRF, GPF, APF, FF, CF, SCF and ECF. Examples of thermal black include FT and MT. Different types of carbon black may be used alone or in combinations of two or more.

The nitrogen adsorption specific surface area (N$_2$SA) of the carbon black is preferably 5 m$^2$/g to 200 m$^2$/g. The dibutyl phthalate (DBP) absorption of the carbon black is preferably 5 mL/100 g to 300 mL/100 g. The nitrogen adsorption specific surface area can be measured according to ASTM D4820-93, and the DBP absorbed dose can be measured according to ASTM D2414-93. Commercial carbon black products that may be used include "DIABLACK N339", trade name of Mitsubishi Chemical Corp., "SEAST 6", "SEAST 7HM" and "SEAST KH", trade names of Tokai Carbon Co., Ltd., and "CK 3" and "Special Black 4A", trade names of Evonik Co.

The content of the reinforcing material in the polymer composition is 10 parts by mass or greater, preferably 20 parts by mass or greater and more preferably 30 parts by mass or greater with respect to 100 parts by mass of the polymer, for improved wet grip performance. The content of the reinforcing material is also no greater than 150 parts by mass, preferably no greater than 120 parts by mass and more preferably no greater than 100 parts by mass, for an increased reinforcing property.

Other polymer components and additives may also be combined with the polymer of this embodiment to prepare a polymer composition.

Examples for the other polymer component include conventional styrene-butadiene copolymer rubber, polybutadiene rubber, butadiene-isoprene copolymer rubber, butyl rubber, natural rubber, ethylene-propylene copolymer and ethylene-octene copolymer. These polymer components may be used alone or in combinations of two or more.

When another polymer component is to be added, the content of the polymer of this embodiment in the polymer composition is preferably 10 parts by mass or greater and more preferably 20 parts by mass or greater with respect to 100 parts by mass of the total amount of polymer component (including the conjugated diene-based polymer), from the viewpoint of increasing the wet grip performance.

Publicly known additives may be used, including vulcanizing agents such as sulfur; vulcanization accelerators such as thiazole-based vulcanization accelerators, thiuram-based vulcanization accelerators, sulfenamide-based vulcanization accelerators and guanidine-based vulcanization accelerators; vulcanizing activators such as stearic acid and zinc oxide; organic peroxides; silane coupling agents; extender oils; processing aids; age inhibitors; and lubricants.

Examples of silane coupling agents include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide and γ-trimethoxysilylpropylbenzothiazyl tetrasulfide. These silane coupling agents may be used alone or in combinations of two or more. Commercially available products include "Si69" and "Si75", trade names of Evonik Co.

The silane coupling agent content is preferably 1 to 20 parts by mass, more preferably 2 to 15 parts by mass and even more preferably 5 to 10 parts by mass with respect to 100 parts by mass of the reinforcing material.

Examples of extender oils include aromatic-based mineral oils (viscosity gravity constant (V.G.C.) value: 0.900 to 1.049), naphthene-based mineral oils (V.G.C. value: 0.850 to 0.899) and paraffinic mineral oils (V.G.C. value: 0.790 to 0.849). The polycyclic aromatic content of the extender oil is preferably less than 3 mass % and more preferably less than 1 mass %. The polycyclic aromatic content is measured according to British Petroleum Institute method 346/92. The aromatic compound content (CA) of the extender oil is preferably 20 mass % or greater. Extender oils may be used alone or in combinations of two or more.

Examples of vulcanization accelerators include thiazole-based vulcanization accelerators such as 2-mercaptobenzothiazole, dibenzothiazyldisulfide and N-cyclohexyl-2-benzothiazyl sulfenamide; thiuram-based vulcanization accelerators such as tetramethylthiuram monosulfide and tetramethylthiuram disulfide; sulfenamide-based vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide and N,N'-diisopropyl-2-benzothiazole sulfenamide; and guanidine-based vulcanization accelerators such as diphenylguanidine, diorthotolylguanidine and ortho-tolylbiguanidine. Vulcanization accelerators may be used alone or in combinations of two or more.

The vulcanization accelerator content is preferably 0.1 to 5 parts by mass and more preferably 0.2 to 3 parts by mass with respect to 100 parts by mass of the polymer component.

The method used to produce the polymer composition of this embodiment may be one that is publicly known, such as kneading of the components with a roll or a known type of mixer such as a Banbury mixer.

As the kneading conditions when additives other than a vulcanizing agent and vulcanization accelerator are to be added, the kneading temperature will usually be 50 to 200° C. and preferably 80 to 190° C., and the kneading time will usually be 30 seconds to 30 minutes and preferably 1 minute to 30 minutes. When a vulcanizing agent and vulcanization accelerator are to be added, the kneading temperature will usually be no higher than 100° C. and preferably room temperature to 80° C. The composition in which a vulcanizing agent and vulcanization accelerator have been added is usually used after vulcanizing treatment by press vulcanization or the like. The curing temperature will usually be 120 to 200° C., and is preferably 140 to 180° C.

The polymer composition of this embodiment has an excellent balance between wet grip performance and fuel efficiency, and may be suitably used in a vehicle tire.

EXAMPLES

The present invention will now be explained in greater detail through the following examples, with the understanding that these examples are in no way limitative on the invention.

The following methods were used to evaluate the physical properties.

1. Mooney Viscosity ($ML_{1+4}$)
The initial Mooney viscosity of the polymer was measured at 100° C., according to JIS K6300(1994).

2. Vinyl Bonds (Units: Mol %)
The amount of vinyl bonds in the conjugated diene of the polymer was determined by infrared spectroscopic analysis, based on the absorption intensity near 910 cm$^{-1}$ which is the absorption peak for vinyl groups.

3. Content of Monomer Units Derived from Styrene (Units: Mass %)
The content of monomer units derived from styrene in the polymer was determined from the refractive index, according to JIS K6383(1995).

4. Molecular Weight Distribution (Mw/Mn)
The Mp, Mw and Mn were measured by GPC under the following conditions (1) to (8), and the molecular weight distribution (Mw/Mn) of the polymer was calculated.
(1) Apparatus: HLC-8220, Tosoh Corp.
(2) Separating column: TSKgel SuperHM-H (two in series), Tosoh Corp.
(3) Measuring temperature: 40° C.
(4) Carrier: Tetrahydrofuran
(5) Flow rate: 0.6 mL/min
(6) Injection rate: 5 μL
(7) Detector: Differential refractometer
(8) Molecular weight reference: Standard polystyrene 5. Compound Mooney Viscosity ($MS_{1+4}$)
The Mooney viscosity of the polymer composition was measured at 100° C. according to JIS K6300(1994).

6. Shear Viscosity
The shear viscosity of the polymer composition was measured at a shear rate of 91.2 sec$^{-1}$ using a Capillograph 1C by Toyo Seiki Seisakusho, Ltd., under conditions with an orifice of L/D20 and a measuring temperature of 100° C.

7. Tensile Break Strength (Units: MPa) and Tensile Breaking Elongation (Units: %)
A No. 3 shape dumbbell test strip was punched out from a vulcanized sheet and provided for testing. The No. 3 shape dumbbell test strip was used according to JIS K6251 with a pull rate of 500 mm/min, and the stress (tensile break strength) and elongation percentage (tensile breaking elongation) at the point where the test strip tore were measured at 23° C.

Example 1

<Fabrication of Conjugated Diene-Based Polymer>
(Step 1)
A stirrer-mounted stainless steel polymerization reactor with an internal volume of 20 L was washed and dried, and the atmosphere in the interior of the polymerization reactor was exchanged with dry nitrogen. Next, 7.65 kg of industrial hexane (Sumitomo Chemical Co., Ltd., trade name: Hexane (common name), density: 0.68 g/mL), 2.93 kg of cyclohexane, 405 g of 1,3-butadiene, 495 g of styrene, 6.1 mL of tetrahydrofuran, 0.5 mL of ethyleneglycol diethyl ether and 1.5 mL of ethyleneglycol dibutyl ether were loaded into the polymerization reactor. For preliminary detoxification of the impurities with the potential to inactivate the polymerization initiator, a hexane solution containing a small amount of n-butyllithium (n-BuLi) was loaded into the polymerization reactor as a scavenger, after which an n-hexane solution containing 1.10 mmol of n-BuLi was loaded into the polymerization reactor, then polymerization reaction was then initiated. During the polymerization reaction, the temperature in the polymerization reactor was adjusted to 65° C. and the solution in the polymerization reactor was stirred at a stirring speed of 130 rpm, with 1,3-butadiene and styrene being continuously supplied into the polymerization reactor 20 minutes after the start of polymerization.

(Step 2)

After the polymerization reaction had been conducted for 40 minutes, an n-hexane solution containing 4.40 mmol of n-BuLi was loaded into the polymerization reactor, and polymerization reaction was continued for 25 minutes. Next, 3.84 mmol of bis(diethylamino)methylvinylsilane was loaded into the polymerization reactor, and after conducting polymerization reaction for 45 minutes, an n-hexane solution containing 5.50 mmol of n-BuLi was loaded into the polymerization reactor and polymerization reaction was continued for 140 minutes. During the total of 4 hours and 10 minutes of polymerization, the polymerization reactor was continuously supplied with 1,3-butadiene for 200 minutes and styrene for 115 minutes, for a feed amount of 693 g for 1,3-butadiene and a feed amount of 207 g for styrene in total.

(Step 3)

While maintaining a temperature of 65° C. in the polymerization reactor, the polymerization solution in the polymerization reactor was stirred at a stirring speed of 130 rpm, 11.00 mmol of N-(3-dimethylaminopropyl)acrylamide was added to the polymerization solution, and stirring was continued for 15 minutes. After then loading 20 ml of a hexane solution containing 0.8 mL of methanol into the polymerization reactor, the polymerization solution was stirred for 5 minutes.

The stirred mixture in the polymerization reactor was extracted and a portion thereof was dried at ordinary temperature for 24 hours, volatilizing off most of the volatile components, and it was then dried under reduced pressure at 55° C. for 12 hours, and the amount of vinyl bonds, the styrene unit content and the molecular weight of the resulting polymer were measured.

The stirred mixture in the polymerization reactor was extracted, and then 7.2 g of 2-tert-butyl-6-(3-tert-butyl-2-hydroxy-5-methylbenzyl)-4-methylphenyl acrylate (trade name: SUMIRIZER GM by Sumitomo Chemical Co., Ltd.), 3.6 g of pentaerythrityltetrakis(3-lauryl thiopropionate) (trade name: SUMIRIZER TP-D, product of Sumitomo Chemical Co., Ltd.) and 450 g of an extender oil (trade name: JOMO Process NC-140, product of Japan Energy Corp.) were added to obtain a mixture. Most of the volatile components in the mixture were vaporized off at ordinary temperature for 24 hours, and reduced pressure drying was carried out at 55° C. for 12 hours to obtain a conjugated diene-based polymer.

<Preparation of Polymer Composition>

In a Laboplastomil there were kneaded 125 parts by mass of a conjugated diene-based polymer, 80.0 parts by mass of silica (product of Evonik Co., trade name: ULTRASIL VN3-G), 6.4 parts by mass of a silane coupling agent (product of Evonik Co., trade name: Si69), 5.0 parts by mass of carbon black (product of Mitsubishi Chemical Corp., trade name: DIABLACK N339), 10.0 parts by mass of an extender oil (product of Japan Energy Corp., trade name: JOMO Process NC-140), 2.0 parts by mass of an age inhibitor (product of Sumitomo Chemical Co., Ltd., trade name: ANTIGEN 6C), 2.0 parts by mass of wax (product of Ouchi Shinko Chemical Industrial Co., Ltd., trade name: SUNNOC N), 1.0 part by mass of wax (product of Struktol, trade name: EF44), 2.0 parts by mass of stearic acid and 3.0 parts by mass of zinc oxide, to prepare a polymer composition.

<Fabrication of Vulcanized Sheet>

To this polymer composition there were added 1.5 parts by mass of a vulcanization accelerator (product of Sumitomo Chemical Co., Ltd., trade name: SOXINOL CZ), 2.0 parts by mass of another vulcanization accelerator (product of Sumitomo Chemical Co., Ltd., trade name: SOXINOL D) and 1.5 parts by mass of sulfur, and the mixture was molded into a sheet using a 6-inch roll and heated at 160° C. for 55 minutes for vulcanization, to fabricate a vulcanized sheet.

Comparative Example 1

<Fabrication of Conjugated Diene-Based Polymer>

A stirrer-mounted stainless steel polymerization reactor with an internal volume of 20 L was washed and dried, and the atmosphere in the interior of the polymerization reactor was exchanged with dry nitrogen. Next, 7.65 kg of "Hexane" (common name), 2.93 kg of cyclohexane, 405 g of 1,3-butadiene, 495 g of styrene, 6.1 mL of tetrahydrofuran, 0.5 mL of ethyleneglycol diethyl ether and 1.5 mL of ethyleneglycol dibutyl ether were loaded into the polymerization reactor. For preliminary detoxification of the impurities with the potential to inactivate the polymerization initiator, a hexane solution containing a small amount of n-BuLi was loaded into the polymerization reactor as a scavenger, after which an n-hexane solution containing 8.22 mmol of n-BuLi was loaded into the polymerization reactor, and polymerization reaction was then initiated. During the polymerization reaction, the temperature in the polymerization reactor was adjusted to 65° C. and the solution in the polymerization reactor was stirred at a stirring speed of 130 rpm, with 1,3-butadiene and styrene being continuously supplied into the polymerization reactor 20 minutes after the start of polymerization.

After conducting polymerization reaction for 25 minutes, 3.84 mmol of bis(diethylamino)methylvinylsilane was loaded into the polymerization reactor, and polymerization reaction was continued for 3 hours and 45 minutes. During the total of 4 hours and 10 minutes of polymerization, the polymerization reactor was continuously supplied with 1,3-butadiene for 200 minutes and styrene for 115 minutes, for a feed amount of 693 g for 1,3-butadiene and a feed amount of 207 g for styrene in total.

While maintaining a temperature of 65° C. in the polymerization reactor, the polymerization solution in the polymerization reactor was stirred at a stirring speed of 130 rpm, 8.22 mmol of N-(3-dimethylaminopropyl)acrylamide was added to the polymerization solution, and stirring was continued for 15 minutes. After then loading 20 ml of a hexane solution containing 0.8 mL of methanol into the polymerization reactor, the polymerization solution was stirred for 5 minutes.

The stirred mixture in the polymerization reactor was extracted, and 7.2 g of "SUMIRIZER GM", 3.6 g of "SUMIRIZER TP-D" and 450 g of "JOMO Process NC-140" were added to obtain a mixture. Most of the volatile components in the mixture were vaporized off at ordinary temperature for 24 hours, and reduced pressure drying was carried out at 55° C. for 12 hours to obtain a conjugated diene-based polymer.

<Preparation of Polymer Composition and Fabrication of Vulcanized Sheet>

Except for using this polymer, the procedure was carried out in the same manner as Example 1 to prepare a polymer composition and produce a vulcanized sheet.

Table 1 shows the evaluation results for the vinyl bond amounts, styrene unit contents, molecular weight distributions and Mooney viscosities of the polymers obtained in Example 1 and Comparative Example 1, the compound Mooney viscosities and shear viscosities of the polymer compositions, and the tensile break strengths and tensile breaking elongations of the vulcanized sheets. In Table 1, smaller compound Mooney viscosities and shear viscosities indicate superior processability, while higher tensile break strengths and greater tensile breaking elongations indicate superior durability.

TABLE 1

|  | Example 1 | Comparative Example 1 |
|---|---|---|
| Vinyl bonds (mol %) | 33 | 33 |
| Styrene unit content (mass %) | 39 | 39 |
| Mooney viscosity | 43 | 41 |
| Mw/Mn | 2.24 | 1.11 |
| Compound Mooney viscosity | 43 | 51 |
| Shear viscosity (Pa · s) | 4074 | 4213 |
| Tensile break strength (MPa) | 22.2 | 20.1 |
| Tensile breaking elongation (%) | 395 | 360 |

Figure 2:
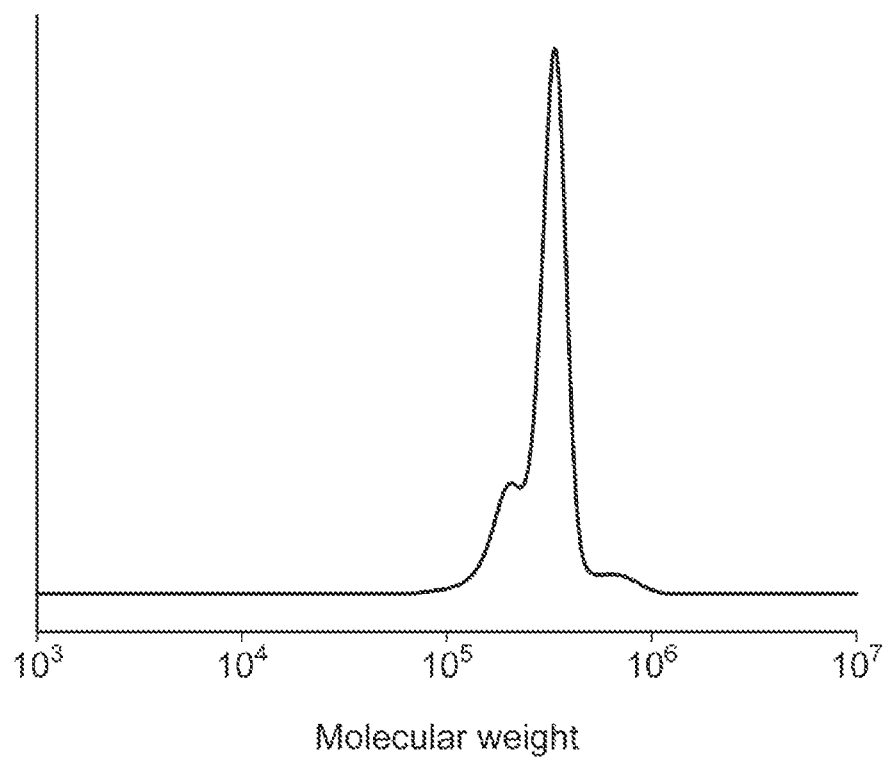
FIG. 2 is a GPC chart for the conjugated diene-based polymer obtained in Comparative Example 1.

FIG. 1 shows a GPC chart for the polymer obtained in Example 1, and FIG. 2 shows a GPC chart for the polymer obtained in Comparative Example 1. As confirmed by FIG. 1, divided addition of a polymerization initiator produced a conjugated diene-based polymer with a peak with a Mp of greater than 800,000, a peak with a Mp in the range of 100,000 to 800,000, and a peak with a Mp of less than 100,000.

The invention claimed is:

1. A method for producing a conjugated diene-based polymer comprising:
    step 1 in which a polymerization initiator is added to a monomer including a conjugated diene compound in a hydrocarbon solvent to obtain a polymerization solution, and
    step 2 in which a polymerization initiator and the monomer including a conjugated diene compound are further added to the polymerization solution either once or two or more times and polymerization reaction is further conducted to obtain a polymer with an active end,
    wherein in step 1 and/or step 2, a modifying agent is added which has a functional group that is copolymerizable with the conjugated diene compound.

2. The method for producing a conjugated diene-based polymer according to claim 1, further comprising step 3 in which the polymer with the active end is reacted with a modifying agent having a functional group that is reactive with the active end, to introduce a unit based on the modifying agent at the polymer end.

3. A method for producing a conjugated diene-based polymer comprising:
    step 1 in which a polymerization initiator is added to a monomer including a conjugated diene compound in a hydrocarbon solvent to obtain a polymerization solution,
    step 2 in which a polymerization initiator and the monomer including a conjugated diene compound are further added to the polymerization solution either once or two or more times and polymerization reaction is further conducted to obtain a polymer with an active end, and
    step 3 in which the polymer with the active end is reacted with a modifying agent having a functional group that is reactive with the active end, to introduce the modifying agent-based unit at the end of the polymer.

4. A conjugated diene-based polymer having at least a peak with a peak top molecular weight greater than 800,000, a peak with a peak top molecular weight in the range of 100,000 to 800,000 and a peak with a peak top molecular weight less than 100,000, as measured by gel permeation chromatography, and having a monomer unit derived from at least one type of modifying agent selected from the group consisting of compounds with the structure represented by the following formula (6), compounds with the structure represented by the following formula (7) and compounds with the structure represented by the following formula (8),

(6)

[In formula (6), $X^1$, $X^2$ and $X^3$ each independently represent a hydrocarbyl group, a hydrocarbyloxy group, a halogen atom or a functional group capable of reacting with the active end of the conjugated diene-based polymer, $R^{61}$ and $R^{62}$ each independently represent a hydrogen atom or a hydrocarbyl group, and when multiple $R^{61}$ and $R^{62}$ groups are present they may be the same or different, $A^1$ represents an organic group having at least one atom selected from the group consisting of oxygen atoms, nitrogen atoms, phosphorus atoms, sulfur atoms and silicon atoms, optionally having a ring structure, with a portion of the structure of $X^1$, $X^2$ or $X^3$ optionally bonded to a portion of $A^1$, and "a" represents an integer of 0 to 10],

(7)

[In formula (7), $R^{71}$ represents a hydrogen atom or a hydrocarbyl group, s represents 0 or 1 (an integer of 0 or 1), $R^{72}$ represents a hydrocarbylene group, and $A^2$ represents a substituted amino group, a nitrogen-containing heterocyclic group or a substituted silyl group],

(8)

[In formula (8), $R^{81}$ and $R^{82}$ each independently represent an optionally substituted hydrocarbyl group, or they represent a hydrocarbylene group wherein a portion of $R^{81}$ and a portion of $R^{82}$ are bonded, optionally having a nitrogen atom and/or an oxygen atom, or $R^{84}$ represents an optionally substituted hydrocarbyl group or a hydrogen atom, or a portion of either $R^{81}$ or $R^{82}$ and a portion of $R^{84}$ are bonded together to form a hydrocarbylene group, which optionally has a nitrogen atom and/or an oxygen atom, $R^{83}$ represents a divalent group, and n is 0 or 1.

5. The conjugated diene-based polymer according to claim 4, wherein the area of the peak of maximum height in a peak top molecular weight range of 100,000 to 800,000 is 40 to 95% of the total peak area.

6. The conjugated diene-based polymer according to claim 4, wherein the area of the peak of maximum height in a peak top molecular weight range of less than 100,000 is no greater than 20% of the total peak area.

7. The conjugated diene-based polymer according to claim 5, wherein the area of the peak of maximum height in a peak top molecular weight range of less than 100,000 is no greater than 20% of the total peak area.

* * * * *